US012408030B2

United States Patent
Wu

(10) Patent No.: US 12,408,030 B2
(45) Date of Patent: Sep. 2, 2025

(54) METHODS AND APPARATUS FOR SUPPORTING DEVICE MOBILITY ALLOWING A SERVICE SUBSCRIBER TO RECEIVE SERVICE IN MULTIPLE NETWORKS

(71) Applicant: Charter Communications Operating, LLC, St. Louis, MO (US)

(72) Inventor: Deh-Min Richard Wu, Centennial, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 316 days.

(21) Appl. No.: 17/945,393

(22) Filed: Sep. 15, 2022

(65) Prior Publication Data

US 2024/0098490 A1 Mar. 21, 2024

(51) Int. Cl.
*H04W 12/06* (2021.01)
*H04L 61/5014* (2022.01)
(Continued)

(52) U.S. Cl.
CPC ......... *H04W 12/06* (2013.01); *H04L 61/5014* (2022.05); *H04W 60/00* (2013.01); *H04W 80/10* (2013.01)

(58) Field of Classification Search
CPC ..... H04W 48/18; H04W 60/00; H04W 72/23; H04W 76/10; H04W 8/08; H04W 12/06;
(Continued)

(56) References Cited

U.S. PATENT DOCUMENTS 8,145,195 B2 3/2012 Forsberg et al.
8,261,089 B2 9/2012 Leon Cobos et al.
(Continued)

OTHER PUBLICATIONS

Omkar Dharmadhikari, Introducing Evolved Mobile Virtual Network Operator (MVNO) Architectures for Converged Wireless Deployments, Nov. 9, 2021, 21 pages, Informed Blog by CableLabs, downloaded from https://www.cablelabs.com/blog/gaussian-splatting-immersive-scenes.
(Continued)

*Primary Examiner* — Kwasi Karikari
(74) *Attorney, Agent, or Firm* — Straub & Straub; Michael P. Straub; Stephen T. Straub

(57) ABSTRACT

A customer communications device of a first network operator (H-MVNO) detects a network identifier from an access point of a second network (MNO) indicating that the second network provides access for first network devices in accordance with a sharing agreement. The device registers via the access point of the second network. Authentication and authorization for the device is performed by a first network security entity on behalf second network, with the device using a restricted use first IP address acquired from a DHCP in the second network. The home network (H-MVNO) sets up the session QoS from the home PCF and home SMF toward the visiting network SMF. The visiting network SMF executes the traffic QoS class via the visiting UPF with the device using a second IP address acquired from a DHCP in the second network for user plane data traffic through the second network.

22 Claims, 24 Drawing Sheets

(51) Int. Cl.
*H04W 60/00* (2009.01)
*H04W 80/10* (2009.01)

(58) Field of Classification Search
CPC ... H04W 12/08; H04W 76/19; H04W 36/362; H04W 48/20; H04W 72/04
See application file for complete search history.

(56) References Cited

U.S. PATENT DOCUMENTS

| 10,448,251 B1 | 10/2019 | Maria | |
|---|---|---|---|
| 2005/0221853 A1 | 10/2005 | Silvester | |
| 2015/0105075 A1* | 4/2015 | Yu | H04L 67/303 455/435.2 |
| 2020/0163149 A1* | 5/2020 | Mildh | H04W 68/005 |

OTHER PUBLICATIONS

Dharmadhikari et al., Evolved MVNO Architectures for Converged Wireless Deployments, 2021 Fall Technical Forum, 2021, 28 pages, SCTE CableLabs and NCTA.

Omkar Dharmadhikari, Converged Networks and Mobility Evolved MVNO Architectures for Converged Wireless Deployments, 2021 Fall Technical Forum, 2021, 13 pages, SCTE a subsidary of CableLabs.

\* cited by examiner

| FIGURE 4A |
|---|
| FIGURE 4B |

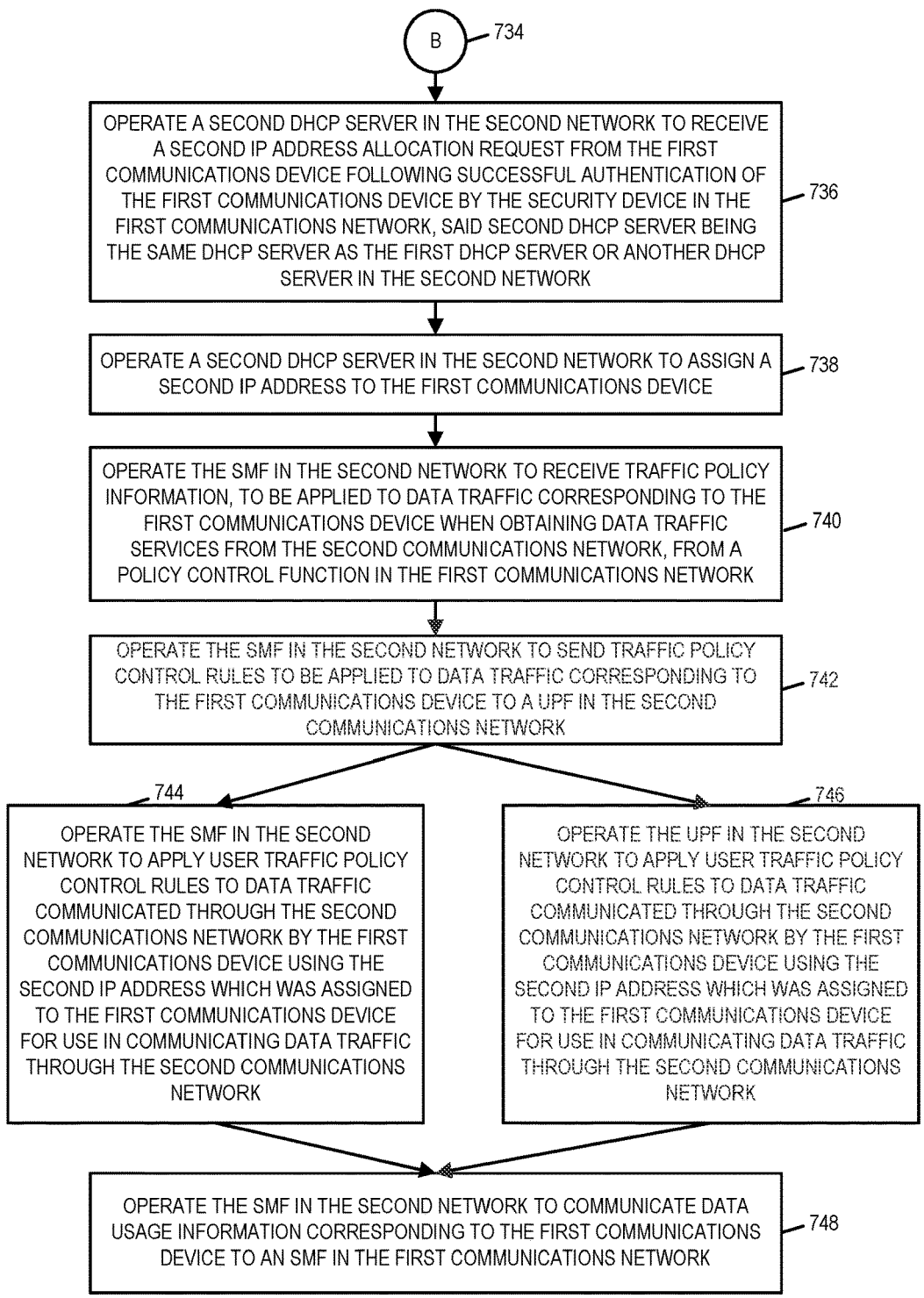

METHODS AND APPARATUS FOR SUPPORTING DEVICE MOBILITY ALLOWING A SERVICE SUBSCRIBER TO RECEIVE SERVICE IN MULTIPLE NETWORKS

FIELD

The present application relates to communications and, more particularly, to methods and apparatus for providing for supporting device mobility, e.g., to methods and apparatus for allowing a subscriber to receive service in multiple networks using a single service subscription.

BACKGROUND

Recently, there has been a growth in the implementation and use of virtual mobile network operators (MVNOs). A particular MVNO may have a limited coverage area for its customers (subscribers) to use without incurring additional cost for roaming, and typically the MVNO will partner with one or more other networks, e.g., a MNO, which may have a larger overall coverage area.

One approach to widen the coverage area for a MVNO's subscribers is to equip the MVNO's subscribers' communications devices with two or more SIMs, each SIM with a set of credentials for a particular network with which the MVNO subscriber may access, e.g., a SIM with MVNO credentials and a subscriber profile and a SIM with MNO credentials and the subscriber profile. However, this approach requires dual SIM capability in the customer communications devices and many user devices, e.g., legacy customer communications devices do no support dual SIM capability.

Another approach is for the MNVO to share its subscribers credentials, profiles, and security information with the partner MNO, with the MVNO and MNO each maintaining a copy. However, each network operator generally prefers to tightly control access to its subscribers credentials and authentication/authorization information for security reasons and avoids sharing of such information. In addition, such an approach requires almost continuous updating of the maintained information, e.g., as the full set of credentials, subscribers profiles, etc. can be expected to be constantly undergoing changes.

In addition to overall supported coverage area issues, a subscriber of a MVNO is typically associated with a particular application server in its home MVNO, via which various subscribed services may be provided, and it is useful to have access to that application server. Typically, if a MVNO customer device obtains access via an MNO, it may not have free access to its home application server via the MNO.

Based on the above discussion there is a need for new method and apparatus to support customer devices of a MNVO being able to obtain access via access nodes of a partner MNO. It would be beneficial if at least some of the new methods and apparatus provided for automatic connection of a MVNO customer communications device to an access point of the partner MNO, e.g., without requiring operator input.

SUMMARY

A customer device, e.g., a UE of a subscriber, who subscribes to a first service provider, e.g., a Home-Mobile Virtual Network Operator (H-MVNO), may be, and sometimes does, move from its home network WiFi coverage area to a location, where it has no coverage from its home WiFi. In such a situation, the customer device has to obtain its connectivity via the mobility management. In accordance with a feature of some embodiments, mobility is supported for a first service provider's customer's device anywhere the first service provider has a service agreement with a second service provider (partner service provider), e.g., a Mobile Network Operator (MNO), for extending network coverage, for the first service provider's customers' devices, to access the wireless network of the second service provider.

In some embodiments, the customer device, located outside its home WiFi coverage area, is granted connectivity to a first service provider, e.g., H-MVNO, application (app) server with the help of a AAA server. When a visiting network validates a first service provider's, e.g., H-MVNO's, subscriber identity module (SIM) of the visiting customer device, the mutual authentication is deferred to the first service provider, e.g., H-MVNO network (e.g., H-MVNO HSS or AUSF, UDM and/or AAA server), and the visiting network's HSS or AUSF/UDM acts as a proxy agent.

In some embodiments, connectivity at a location, outside of the subscription WiFi coverage area of the home network (e.g., H-MVNO network) but within the coverage area of the partner service provider (e.g., partner MNO), can be, and sometimes is, set up automatically without performing a manual procedure by the user of the customer device at the visiting area. The user of the customer device can, and sometimes does, use his/her home network service profile while obtaining access through an access point of a visiting network, e.g., partner MNO network.

In various embodiments, a customer device of a subscriber, e.g., of a H-MVNO, is granted connectivity, e.g., free of charge connectivity, to the H-MVNO application server, e.g., with the help of a AAA server. When the visiting network, which corresponds to a partner MNO in partnership with the H-MVNO, validates a SIM of a H-MVNO subscriber device, the mutual authentication is deferred to the H-MVNO and the visiting network HSS or AUSF/UDM acts as a proxy.

The additional authentication procedure is extended from the visiting network HSS or AUSF/UDM to the H-MVNO HSS or AUSF/UDM and/or AAA. The customer device is authenticated by its home network when there is an agreement between the visiting network (e.g., MNO network) and the home network (e.g., H-MVNO network).

Furthermore, the customer device can, and sometimes does, use the customer device home user profile and service capabilities after the home network (H-MVNO network) authenticates the customer device. The home network (H-MVNO) sets up the session QoS from the home PCF and SMF toward the visiting network SMF. The visiting network SMF executes the traffic QoS class via the visiting UPF.

The transport usage records are collected by the visiting network UPF and SMF. In some embodiments the usage records are stored in the UDR of the visiting network. The usage records are reported to the H-MVNO SMF and then stored in the UDR of the H-MVNO.

An exemplary communications method, in accordance with some embodiments, comprises: operating a network access point in a second network to transmit a network identifier associated with a first network operator, subscribers to said first network operator being able to receive service via said network access point in the second network; receiving, from a first communications device at the network access point in the second network a registration request signal; operating a session management function (SMF) in the second network, coupled to the network access point, to communicate at least some authentication or authorization information sent by the first communications device to a security entity in the first network; receiving at the SMF of the second network an authentication response from the security entity in the first network; and making a decision in the SMF to i) provide service to the first communications device via the second network or ii) deny service to the first communications device via the second network based on the received authentication response.

Numerous variations on the described methods and apparatus are possible and while several embodiments are described in detail it should be appreciated that the full set of detailed steps need not be used in all embodiments with many of the features and determinations being useful even if not used with the other features and steps.

The detailed description which follows describes additional features, details and embodiments which can be used alone or in combination.

BRIEF DESCRIPTION OF THE FIGURES

FIG. 4 comprises the combination of FIG. 4A and FIG. 4B.

FIG. 5 comprises the combination of FIG. 5A and FIG. 5B.

FIG. 6 comprises the combination of FIG. 6A and FIG. 6B.

FIG. 7C is a third part of a flowchart of an exemplary method of operating a communications system, e.g., communications system, in accordance with an exemplary embodiment.

FIG. 7 comprises the combination of FIG. 7A, FIG. 7B and FIG. 7C.

DETAILED DESCRIPTION

Figure 1:
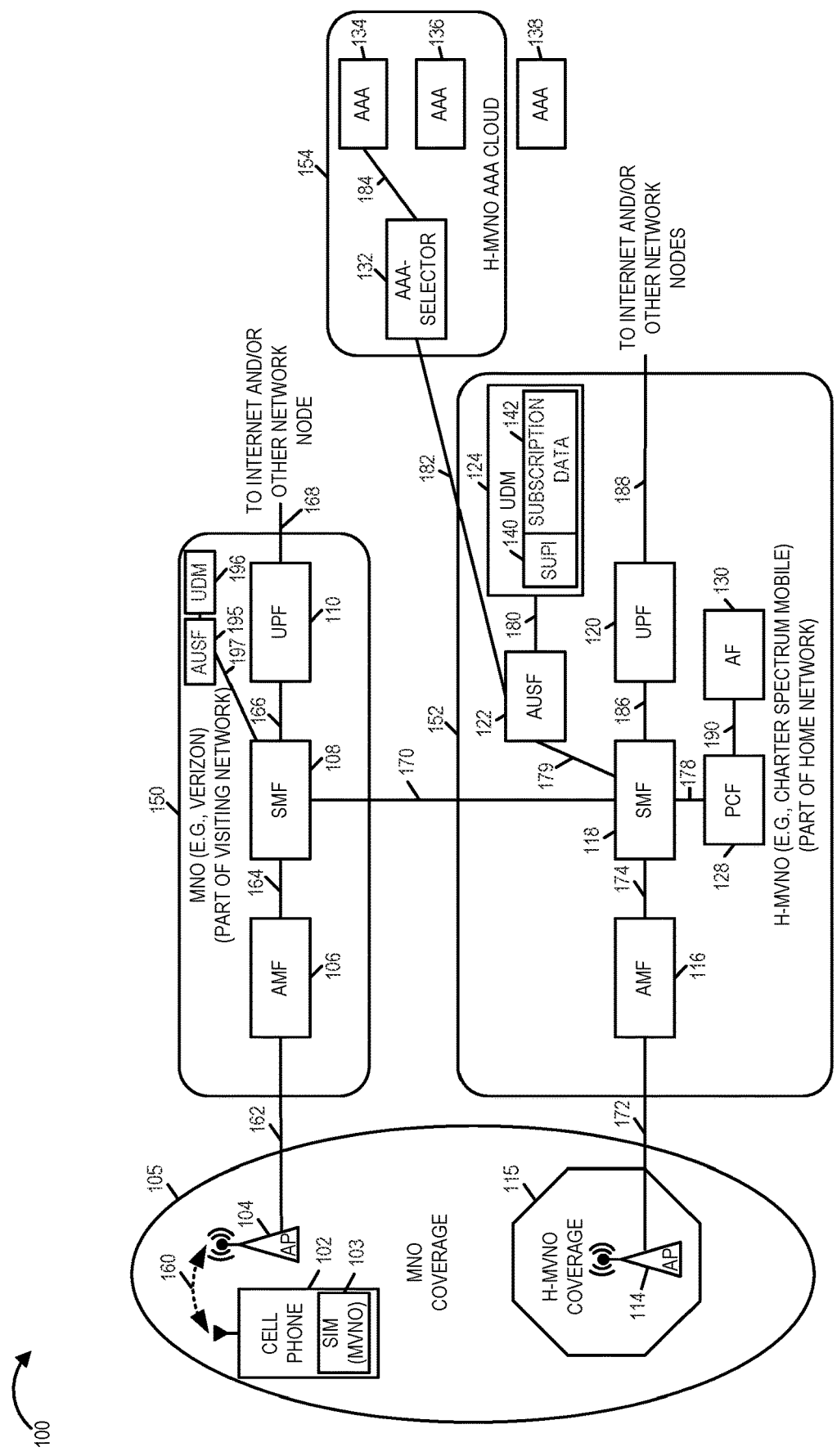
FIG. 1 is a drawing of an exemplary communications system in accordance with an exemplary embodiment.

FIG. 1 is a drawing of an exemplary communications system 100 in accordance with an exemplary embodiment.

Exemplary communications system 100 includes a mobile network operator (MNO) network 150, e.g., a Verizon network, and a home—mobile virtual network operator (H-MVNO) network 152. Exemplary communications system 100 further includes a plurality of customer communications devices including a cell phone 102, e.g., a user equipment (UE) device. The MNO network 150 includes an access and mobility management function (AMF) 106, a session management function (SMF) 108, a user plane function (UPF) 110, an authentication server function (AUSF) 195, and a user data management (UDM) 196. The MNO network 150 further includes an access point (AP 104) with a corresponding MNO coverage area 105. The H-MVNO network 152 includes an AMF 116, a SMF 118, a UPF 120, an authentication server function (AUSF) 122, a user data management (UDM) 124, a policy control function (PCF) 128, and an application function (AF) 130. The H-MVNO network 152 further includes an access point (AP) 114 with a corresponding H-MVNO coverage area 115.

Exemplary system 100 further includes a H-MVNO authentication, authorization and accounting (AAA) cloud 154 including a AAA-selector 132 and a plurality of AAA servers including AAA server 134 and AAA server 136. Exemplary system 100 further includes one or more additional AAA servers including AAA server 138, which is external to the H-MVNO AAA cloud 154.

Cell phone 102 includes a subscriber identity module (SIM) card 103, which is associated with the H-MVNO network 152. H-MVNO network 152 is a home network from the perspective of cell phone 102, and MNO 150 is a visiting network from the perspective of cell phone 102. In FIG. 1, the cell phone 102 is located within MNO coverage area 105 and is sending/receiving wireless signals 160 to/from MNO AP 104, and cell phone 102 is located outside of H-MVNO coverage area 115.

MNO AP 104 is coupled to MNO AMF 106 via communications link 162. AMF 106 is coupled to SMF 108 via communications link 164. SMF 108 is coupled to UPF 110 via communications link 166. UPF 110 is coupled to the Internet and/or other network nodes via communications link 168. AUSF 195 is coupled to SMF 108 via communications link 197.

SMF 108 of MNO network 150 is coupled to SMF 118 of H-MVNO network 152 via communications link 170.

H-MVNO AP 114 is coupled to H-MVNO AMF 116 via communications link 172. AMF 116 is coupled to SMF 118 via communications link 174. SMF 118 is coupled to UPF 120 via communications link 186. UPF 120 is coupled to the Internet and/or other network nodes via communications link 188. SMF 118 is coupled to PCF 128 via communications link 178. PCF 128 is coupled to AF 130 via communications link 190.

SMF 118 is coupled to AUSF 122 via communications link 179. AUSF is coupled to UDM 124 via communications link 180. UDM 124 includes a subscription permanent identifier (SUPI) and subscription data for each subscriber to the H-MVNO including SUPI 140 and subscription data 142 corresponding to the subscriber with SIM card 103, which is included in cell phone 102.

AUSF 122 is coupled to AAA-selector 132 via communications link 182. AAA selector 132 is coupled to AAA server 134 via communications link 184.

In the exemplary embodiment of FIG. 1, there is an agreement between the MNO and the H-MVNO, allowing users subscribing to the H-MVNO to obtain access from APs in the MNO. The APs, e.g., AP 104, in the MNO 150 broadcasts a PLMN value indicating "sharing" between the networks. In the exemplary embodiment of FIG. 1, authentication for a customer device, e.g., cell phone 102, which is seeking to obtain access and communicate via AP 104 of MNO visiting network 150 is via AUSF 122/UDM 124 in H-MVNO network 152 and/or a AAA server, e.g., AAA 134 included in H-VMNO AAA cloud 154 and/or an external AAA server, e.g., AAA server 138. Thus, a roaming customer device, e.g., cell phone 102, is authenticated via AUSF 122/UDM 124 in H-MVNO 152 and/or a AAA server, e.g., AAA 134 in H-MVNO AAA cloud 154 or external AAA server 138. The roaming customer device, e.g., cell phone 102, obtains a limited use leased IP address from a DHCP in the MNO 150 (e.g., located within AMF 106 or SMF 108 or UPF 110) which is used for authentication communications to a security entity of the H-MVNO. Subsequently, following successful authentication, the roaming customer device, e.g., cell phone 102, obtains a leased IP address from a DHCP in the MNO 150 (e.g., located within AMF 106 or SMF 108 or UPF 110) which is used for data traffic communications via the second network. MVNO traffic policy information corresponding to the roaming customer device, e.g., cell phone 102, is communicated from a PCF 128 in the MVNO 152 to the SMF 108 in the MNO 150. The SMF 108 in the MNO 150 makes user traffic scheduling and queuing decisions based on subscriber and policy data including subscriber and policy data corresponding to cell phone 120, which was communicated from the MVNO 152.

Figure 2:
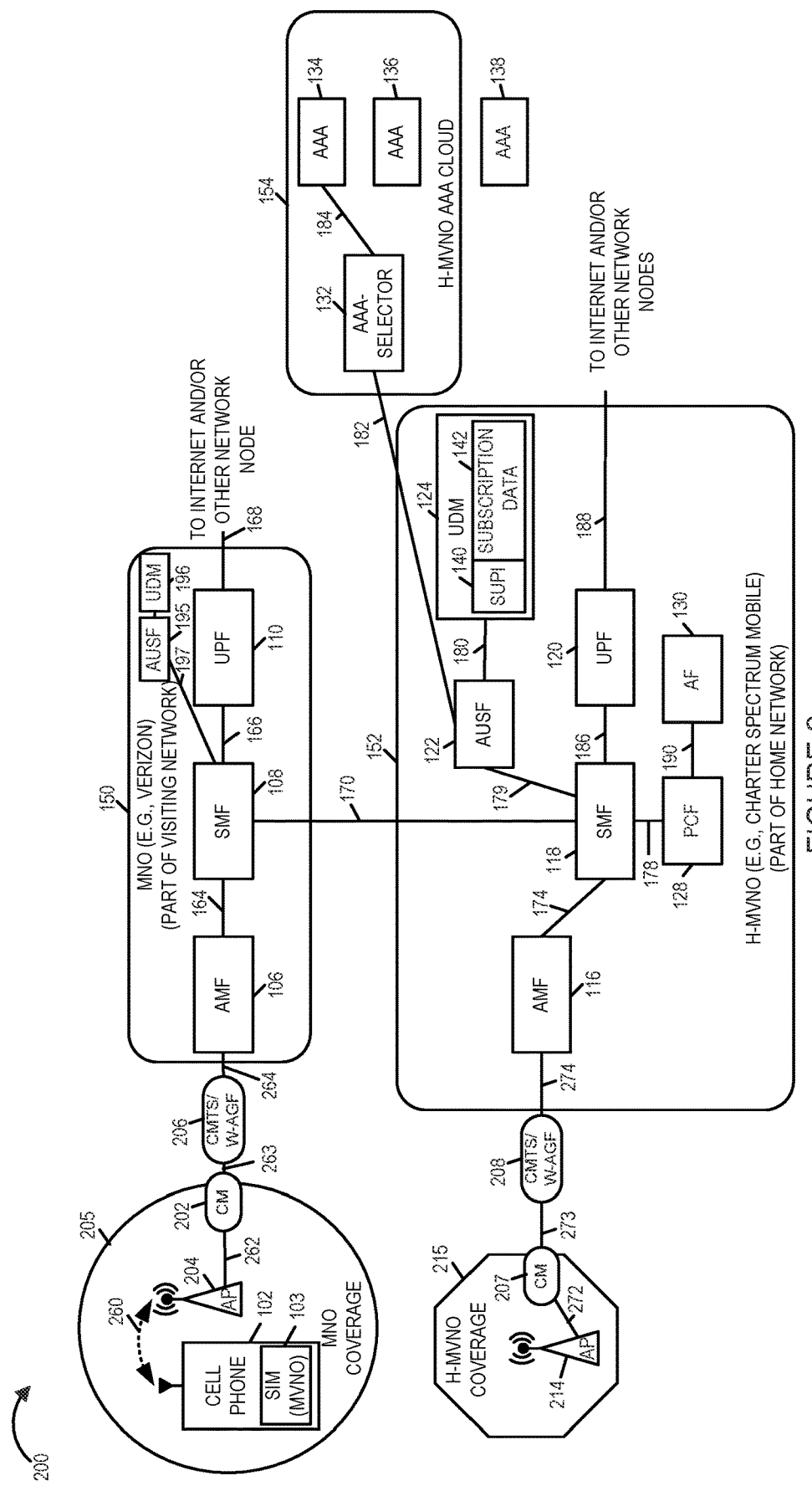
FIG. 2 is a drawing of another exemplary communications system in accordance with an exemplary embodiment, said exemplary system including a cable modem termination system (CMTS).

FIG. 2 is a drawing of an exemplary communications system 200 in accordance with an exemplary embodiment. Exemplary communications system 200 includes a mobile network operator (MNO) network 150, e.g., a Verizon network, and a home—mobile virtual network operator (H-MVNO) network 152. Exemplary communications system 200 further includes a plurality of customer communications devices include a cell phone 102, e.g., a user equipment (UE) device. The MNO network 150 includes an access and mobility management function (AMF) 106, a session management function (SMF) 108, a user plane function (UPF) 110, an authentication server function (AUSF) 195, and a user data management (UDM) 196. The MNO network 150 further includes an access point (AP) 204 with a corresponding MNO coverage area 205. The H-MVNO network 152 includes an AMF 116, a SMF 118, a UPF 120, an authentication server function (AUSF) 122, a user data management (UDM) 124, a policy control function (PCF) 128 and an application function (AF) 130. The H-MVNO network 152 further includes an access point (AP) 214 with a corresponding H-MVNO coverage area 215.

Exemplary system 200 further includes a H-MVNO authentication, authorization and accounting (AAA) cloud 154 including a AAA-selector 132 and a plurality of AAA servers including AAA server 134 and AAA server 136. Exemplary system 200 further includes one or more additional AAA servers includes AAA server 138, which is external to the H-MVNO AAA cloud 154.

Cell phone 102 includes a subscriber identify module (SIM) card 103, which is associated with the H-MVNO network 152. H-MVNO network 152 is a home network from the perspective of cell phone 102, and MNO 150 is a visiting network from the perspective of cell phone 102. In FIG. 2, the cell phone 102 is located within MNO coverage area 205 and is sending/receiving wireless signals 260 to/from MNO AP 204, and cell phone 102 is located outside of H-MVNO coverage area 215.

MNO AP 204 is coupled to MNO AMF 106 via communications link 262, cable modem (CM) 202, communications link 263, cable modem termination system (CMTS)/wireline-access gateway function (W-AGF) 206 and communications link 264. AMF 106 is coupled to SMF 108 via communications link 164. SMF 108 is coupled to UPF 110 via communications link 166. UPF 110 is coupled to the Internet and/or other network nodes via communications link 168. AUSF 195 is coupled to SMF 108 via communications link 197.

SMF 108 of MNO network 150 is coupled to SMF 118 of H-MVNO network 152 via communications link 170.

H-MVNO AP 214 is coupled to H-MVNO AMF 116 via communications link 272, cable mode (CM) 207, communications link 273, CMTS/W-AGF 208 and communications link 274. AMF 116 is coupled to SMF 118 via communications link 174. SMF 118 is coupled to UPF 120 via communications link 186. UPF 120 is coupled to the Internet and/or other network nodes via communications link 188. SMF 118 is coupled to PCF 128 via communications link 178. PCF 128 is coupled to AF 130 via communications link 190.

SMF 118 is coupled to AUSF 122 via communications link 179. AUSF is coupled to UDM 124 via communications link 180. UDM 124 includes a subscription permanent identifier (SUPI) and subscription data for each subscriber to the H-MVNO including SUPI 140 and subscription data 142 corresponding to the subscriber with SIM card 103, which is included in cell phone 102.

AUSF 122 is coupled to AAA-selector 132 via communications link 182. AAA selector 132 is coupled to AAA server 134 via communications link 184.

In the exemplary embodiment of FIG. 2, there is an agreement between the MNO and the H-MVNO, allowing users subscribing to the H-MVNO to obtain access from APs in the MNO. The APs, e.g., AP 204, in the MNO 150 broadcasts a PLMN value indicating "sharing" between the networks. In the exemplary embodiment of FIG. 2, authentication for a customer device, e.g., cell phone 102, which is seeking to obtain access and communicate via AP 204 of MNO visiting network 150 is via AUSF 122/UDM 124 in H-MVNO network 152 and/or a AAA server, e.g., AAA 134 included in H-MVNO AAA cloud 154 and/or an external AAA server, e.g., AAA server 138.

Figure 3:
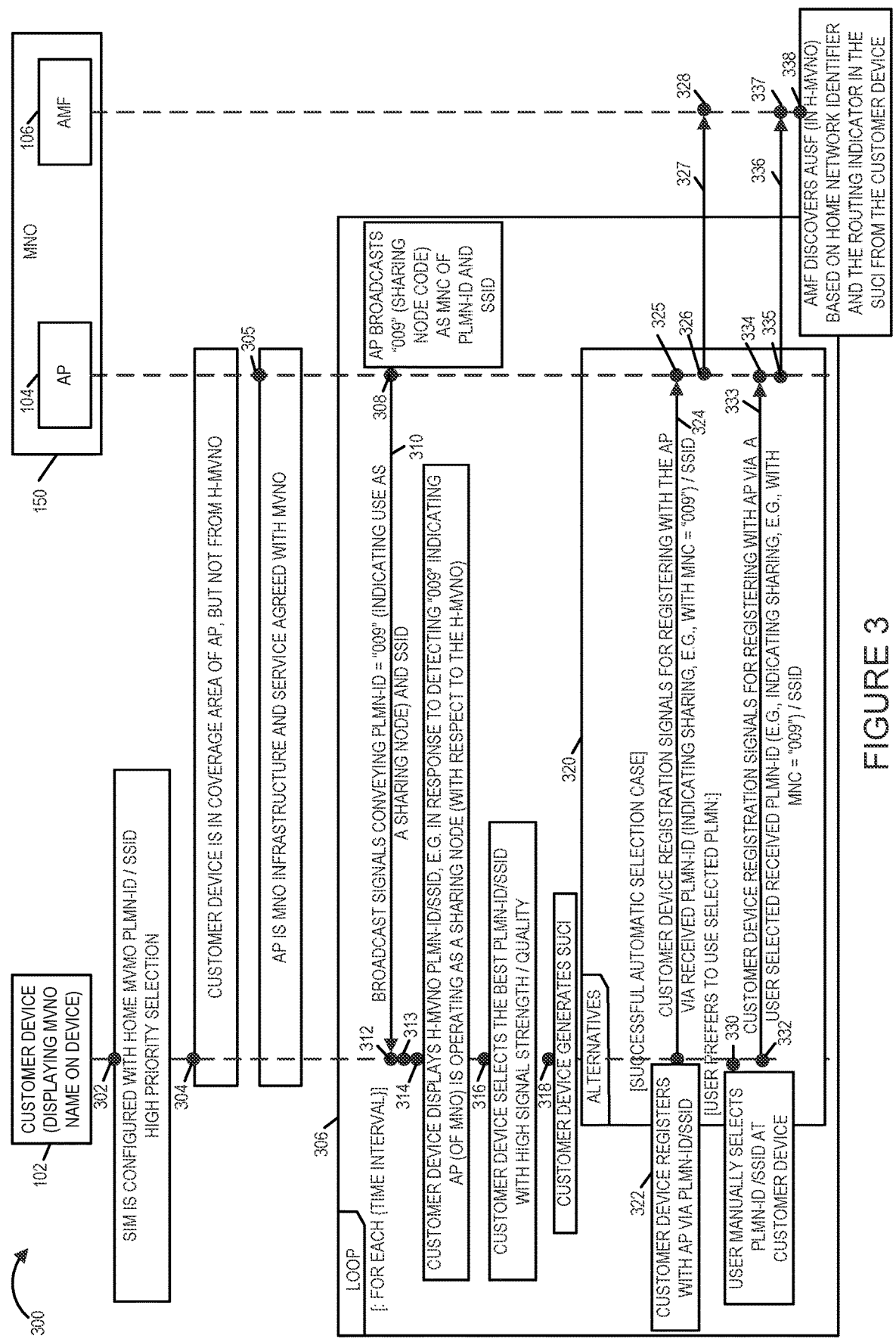
FIG. 3 is drawing of an exemplary signaling diagram illustrating an exemplary method and signaling flow to connect a customer device to an access point in a visiting network in accordance with an exemplary embodiment.

FIG. 3 is drawing 300 of an exemplary signaling diagram illustrating an exemplary method and signaling flow to connect a customer device to an access point in a visiting network in accordance with an exemplary embodiment. Customer device 102, which is a subscriber device for a MVNO, is displaying the MVNO name on the device and includes a SIM card for the MVNO. The SIM card 103 in customer device 102 is configured with home MVNO PLMN-ID/SSID high priority selection, as indicated by block 302. The customer device 102 is located in the coverage area 105 of AP 104 of the MNO network 150, and is located outside the coverage area 115 of H-MVNO network 152, as indicated by block 304. AP 104 is MNO infrastructure and there is an existing service agreement between the MNO and MVNO to provide service to subscribers to the MVNO, as indicated by block 305.

In step 308 AP 104 broadcasts signals 310 communicating a unique number, e.g., an mutually agreed "009" between MNO network 150 and H-MVNO network 152, as the MNC of a PLMN-ID (indicating use as a sharing node) and SSID. In step 312 the customer device 102 receives signal 310 and recovers the communicated information. In step 313 the customer device 102 converts the received network identifier "009" to the network identifier being uses as the home network identifier of the MVNO (e.g., the mobile network code (MNC) of the home PLMN for the first customer device 102 (e.g., the H-MVNO MNC). In step 314 the customer device 102 displays H-MVNO PLMN-ID/SSID, e.g., the customer device 102 displays an indication to the user of the customer device 102 that home network access (e.g., free WiFi coverage—in accordance with the sharing agreement) is available via AP 104 in the MNO. In step 316 the customer device 102 selects the best PLMN-ID/SSID, e.g., with the highest signal strength/quality, e.g., from among a plurality of received signals from different APs. In step 318 customer device 102 generates a subscription concealed identifier (SUCI) for the International Mobile Subscriber Identity (IMSI) based on the SUPI.

Block 320 includes two alterative including a successful automatic selection case and a manual selection case. Step 322 is performed as part of a successful automatic selection case. In step 322 the customer device 102 registers with the AP 104 via PLMN-ID (indicating sharing, e.g., with MNC="009")/SSID. In step 322 the customer device 102 sends customer device registrations signals 324, for registering with the AP 104, via PLMN-ID/SSID ("009" and SSID). The customer device registration signals 324 include the sharing node identifier value, e.g., MNC="009" of PLMN_ID, so that the network, e.g., AP 104 of MNO 150, can determine which broadcast network is being selected by the customer device 102. The sharing node identifier value includes a numeric value that allows the customer device to identify that the node transmitting the ID has a sharing relationship with a network with which the user of the customer device has a service agreement. The customer device registration signals 324 also include the SUCI, which was generated in step 318. In step 325, the AP 104 receives the registration signals 324, and in step 326 the AP 104 forwards information included in the registration signals 324 to the AMF 106, as registration signals 327. In step 328 the AMF 106 receives the registration signals 328 and recovers the communicated information.

Step 330 is performed as part of a user preference to use a user selected PLMN. In some embodiments, a user can, and sometimes does, select a preferred access point, e.g., via a pull down list, which provides alphabetically sorted entries of each of the available access points. A user triggers manual selection via an interaction through a navigation of the user end device, e.g., customer device 102, to the wireless connection. This manual selection can, and in some embodiments does, override an automatic selection by the system. By avoiding the automatic selection, a user can manually control and thereby sometimes obtain the best quality or best suited connection when the automatic selection would not result in such a selection. Another reason for using the manual selection is that a specific visiting MNO network service may be needed, and the service is not available from a particular partner AP, which happens to be the automatically selected partner AP. This may happen when there are more than one partner APs which are available to be selected by the customer device 102. In step 330 the user manually selects a PLMN-ID/SSID at the customer device. In step 332 the customer device 102 generates and sends registration signals 333, for registering with AP 104 using the selected PLMN. The customer device registration signals 333 include an identifier identifying the user selected network, e.g., the sharing node identifier value, e.g., MNC="009" of PLMN_ID, so that the network, e.g., AP 104 of MNO 150, can determine which broadcast network is being selected by the customer device 102. The customer device registration signals 333 also include the SUCI, which was generated in step 318. The registration signals 333 are received in step 334 by the AP 104 and the communicated information is recovered. In step 335 the AP 104 forwards information included in the registration signals 333 to the AMF 106, as registration signals 336. In step 337 the AMF 106 receives the registration signals 336 and recovers the communicated information.

In step 338 the AMF 106 discovers the AUSF 122 in the H-MVNO 152 based on the home network identifier and the routing indicator in the SUCI communicated from the customer device 102 in signals 327 or 336. Block 306 identifies steps in a loop, which may be repeated on an ongoing basis.

Figure 4A:
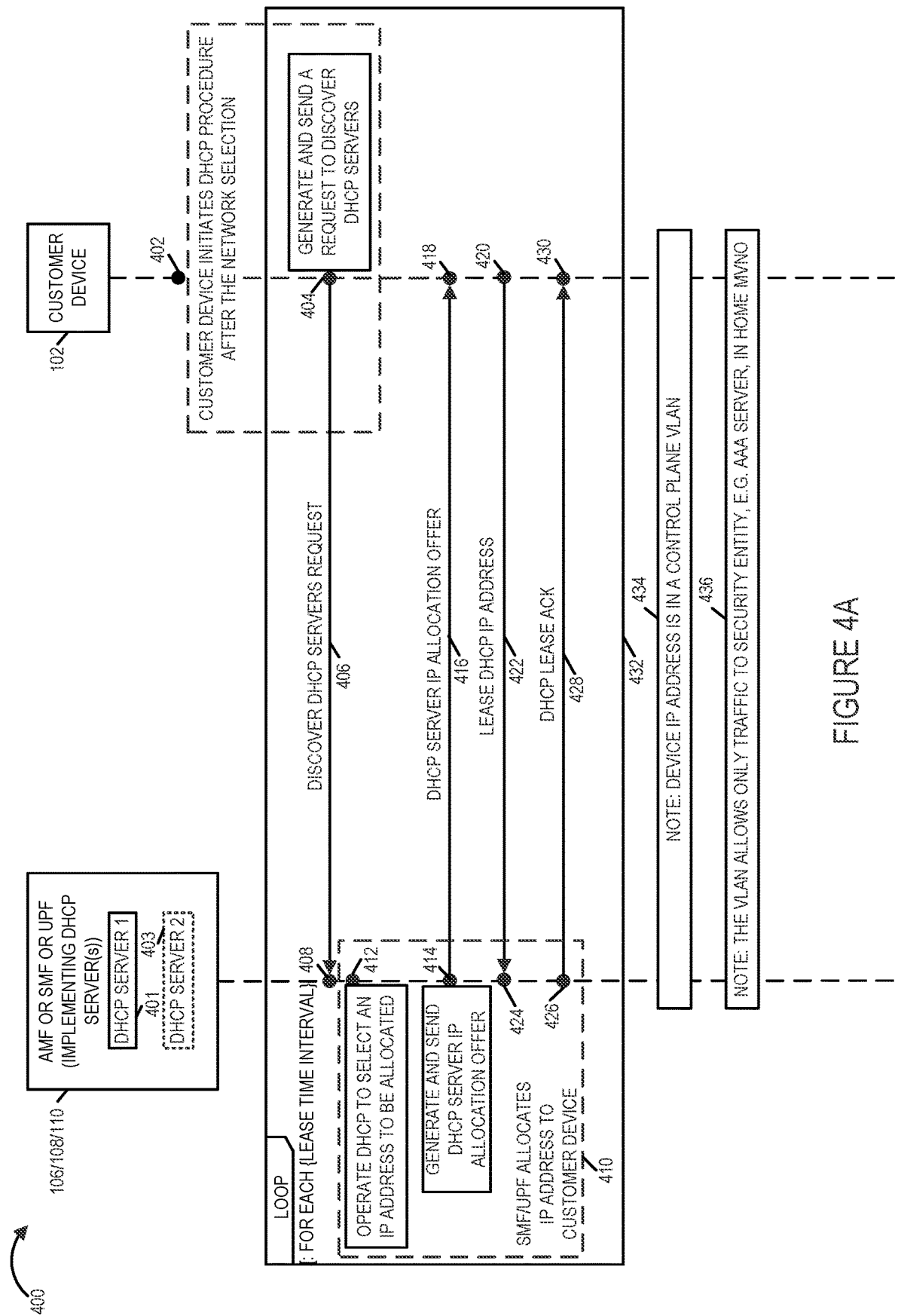
FIG. 4A is a first part of drawing of an exemplary signaling diagram illustrating an exemplary method and signaling flow to connect a customer device to a MNO network (e.g., Verizon Network), for authentication.
Figure 4B:
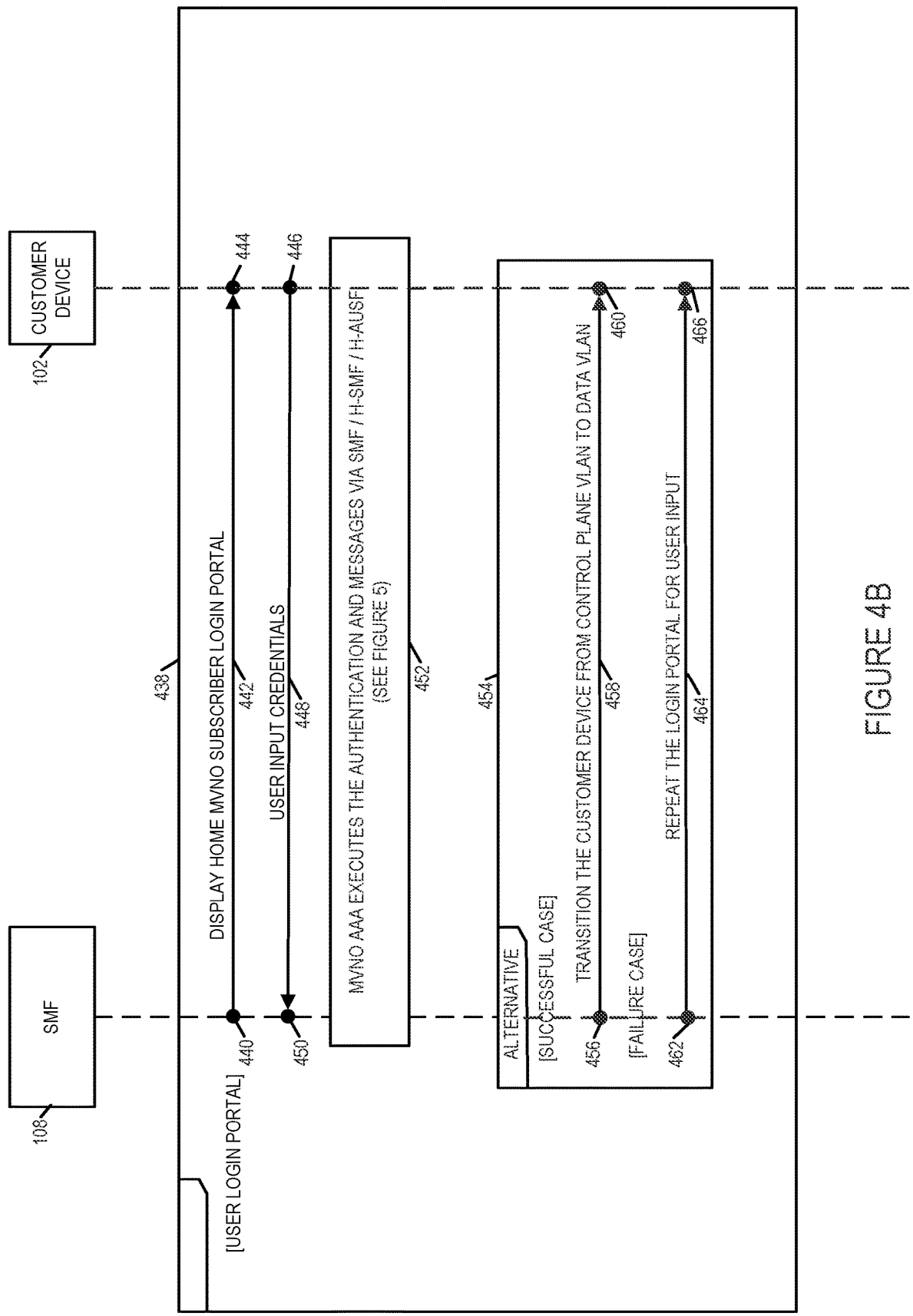
FIG. 4B is a second part of drawing of an exemplary signaling diagram illustrating an exemplary method and signaling flow to connect a customer device to a MNO network (e.g., Verizon Network), for authentication.

FIG. 4, comprising the combination of FIG. 4A and FIG. 4B, is drawing 400 of an exemplary signaling diagram illustrating an exemplary method and signaling flow to connect a customer device 102 to a MNO network 150 (e.g., Verizon Network), for authentication.

In step 402 the customer device 102 initiates a dynamic host configuration protocol (DHCP) procedure after network selection. Step 402 includes step 404, in which the customer device 102 generates and sends a request 406 to discover DHCP servers to SMF 108 or UPF 110 or AMF 106, which is implementing the DHCP server. In step 408 the device (SMF 108 or UPF 110 or AMF 106) which is implementing the DHCP server receives the request and, in response in step 410, the device (SMF 108 or UPF 110 or AMF 106) which is implementing the DHCP server allocates an IP address to the customer device 102. Step 410 includes steps 412, 414, 424 and 426. In step 412, the DHCP selects an IP address to be allocated. In step 414, the device (SMF 108 or UPF 110 or AMF 106) which is implementing the DHCP server generates and sends DHCP server IP allocation offer 416 to customer device 102. In step 418 the customer device 102 receives the IP allocation offer 416, and in response in step 420, the customer device generates and sends a lease 422 for the DHCP ID address. In step 424 the device (SMF 108 or UPF 110 or AMF 106) which is implementing the DHCP server receives the DHCP lease 422, and in response in step 426 sends a DHCP lease acknowledgment 428, which is received by the customer device 102 in step 430. Block 432 identifies a set of operations which are performed in a loop, e.g., for each lease time interval.

It should be noted the device IP address is in a control plan virtual local area network (VLAN), as indicted by block 434. It should also be noted that the VLAN allows only traffic to security entity, e.g., AAA server, in the home MVNO, as indicated by block 436.

In step 440 the SMF 108 sends signals 442 to display the home MVNO login portal to customer device 102. In step 444 customer device 102 receives signals 442 and display the home MVNO subscriber login portal on the customer device 102. In step 446, the customer device 102 receives user input credentials from the user of customer device 102, and the customer device 102 generates and sends signals 448 including user input credentials to SMF 108. The signals 448 including the user input credentials are received by SMF 108, in step 450.

The MVNO AAA, e.g., AAA 134, executes the authentication and messages are via SMF 108/H-SMF 118/H-AUSF 122, as indicated by block 452. The SMF 108 (in the MNO network 150) is acting as a relay or forwarding device, with the authentication being performed in the home network (H-MVNO 152). Refer to FIG. 5 for details of the exemplary authentication procedure.

Block 454 lists two alternatives. If the authentication was successful operation proceeds to step 456. In step 456 the SMF 108 generates and sends signal 458 to transition the customer device 102 from the control plane VLAN to a data VLAN. In step 460 the customer device receives signals 458 and starts operation to transition from the control plane VLAN to a data VLAN.

However, if the authentication was not successful, then operation proceeds to step 462, in which the SMF 108 sends signals 464 to repeat display of the home HVNO subscribe login portal to attempt to obtain user input, e.g., for another attempt at authentication, since the previous attempt resulted in failure.

Figure 5A:
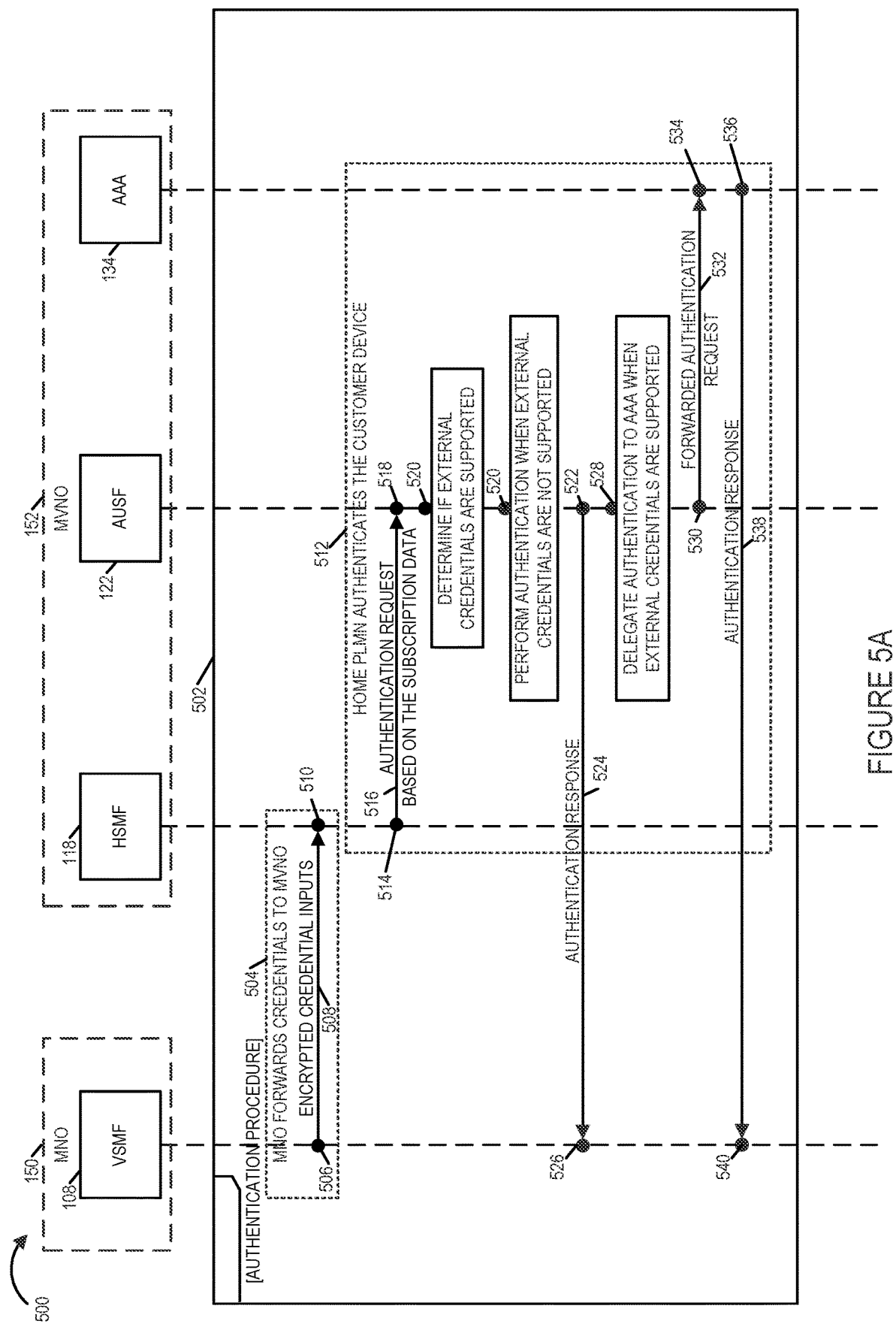
FIG. 5A is a first part of a drawing of an exemplary signaling diagram illustrating an exemplary method and signaling flow to authenticate a roaming customer device via a home (MVNO, e.g., Charter MVNO) network and transition the customer device from a control VLAN to a user plane VLAN following successful authentication, in accordance with an exemplary embodiment.
Figure 5B:
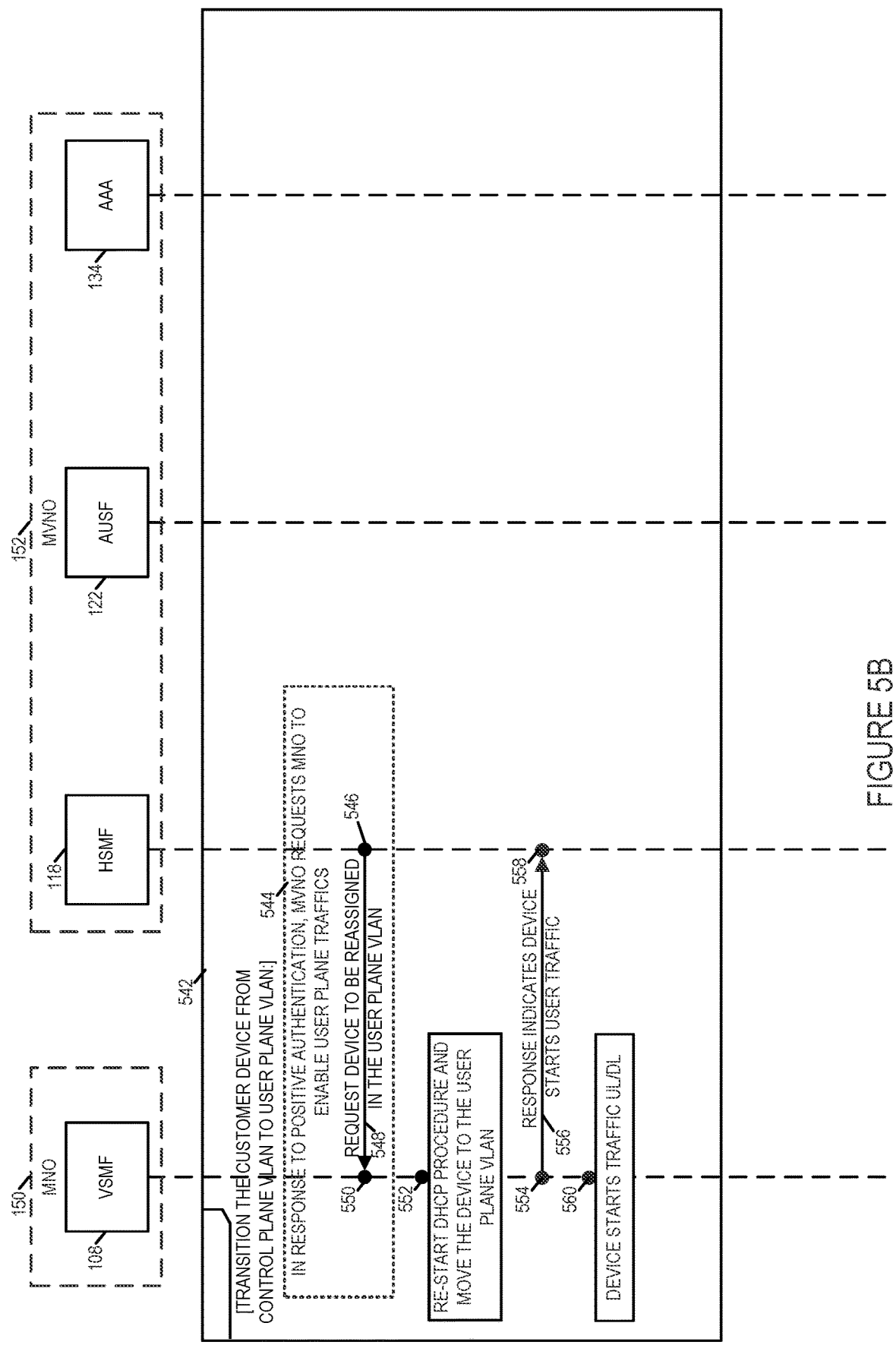
FIG. 5B is a second part of a drawing of an exemplary signaling diagram illustrating an exemplary method and signaling flow to authenticate a roaming customer device via a home (MVNO, e.g., Charter MVNO) network and transition the customer device from a control VLAN to a user plane VLAN following successful authentication, in accordance with an exemplary embodiment.

FIG. 5, comprising the combination of FIG. 5A and FIG. 5B, is drawing 500 of an exemplary signaling diagram illustrating an exemplary method and signaling flow to authenticate a roaming customer device via a home (MVNO, e.g., Charter MVNO) network and transition the customer device from a control VLAN to a user plane VLAN following successful authentication, in accordance with an exemplary embodiment.

Block 502 illustrates an exemplary authentication procedure in accordance with an exemplary embodiment. In step 504 the MNO forwards credentials to the MVNO. Step 504 includes steps 506 and 510. In step 506 SMF 108 of the MNO, referred to as a visiting SMF (VSMF) from the perspective of customer device 102, sends encrypted credential inputs 508 to SMF 118, referred to as a home SMF (HSMF) from the perspective of the customer device 102. In step 510 the HSMF 118 receives the encrypted credential inputs.

In step 512 the home PLMN, from the perspective of customer device 102, authenticates the customer device 102. In step 514 HSMF 118 sends authentication request 516, based on subscription data, to AUSF 122. In step 518 AUSF 122 receives the authentication request. In step 520 the AUSF determines if external credential as supported. When external credentials are not supported, then the AUSF preforms an authentication, and in step 522 sends an authentication response 524 to VSMF 108, which is received by the VSMF 108 in step 526. However, when the determination is that external credentials are supported, then the AUSF 122, in step 528 delegates the authentication to an AAA, e.g., AAA 124. In step 520 the AUSF 122 forwards the authentication request 532 to AAA server 134. In step 534 the AAA server 134 performs an authentication. In step 536 the AAA server 134 generates and sends an authentication response 538 to the VSMF 108. In step 540 the VSMF 108 receives the authentication response 538.

Block 542 illustrates an exemplary transition of the customer communications device 102 from a control plane VLAN to a user plane VLAN in accordance with an exemplary embodiment, following successful authentication of the customer communications device 102 via the home network 152. In step 544, in response to positive authentication, the MVNO requests the MNO to enable user plane traffics. Step 544 includes steps 546 and 550. In step 546 the HSMF 118 generates and sends a request 548 for the customer device 102 to be reassigned in the user plane VLAN. In step 550 the VSMF receives the request 548 for the customer device 102 to be reassigned in the user plane VLAN. In step 552 the VSMF 108, in response to the request 548, re-starts the DHCP procedure and moves the customer device to the user plane VLAN. As part of step 552 the customer device 102 acquires, from the DHCP server, an allocated IP address for the customer device to use, in accordance with a lease, when communicating in the user plane VLAN. In step 554 the VSMF 108 sends a response 556 to HSMF 118 indicating that the customer device 102 starts user traffic. In step 558 the HSMF 118 receives the response and recovers the communicated information. In step 560 the customer device 102, under the control of the VSMF 108, starts UL/DL traffic via the user plane VLAN.

Figure 6A:
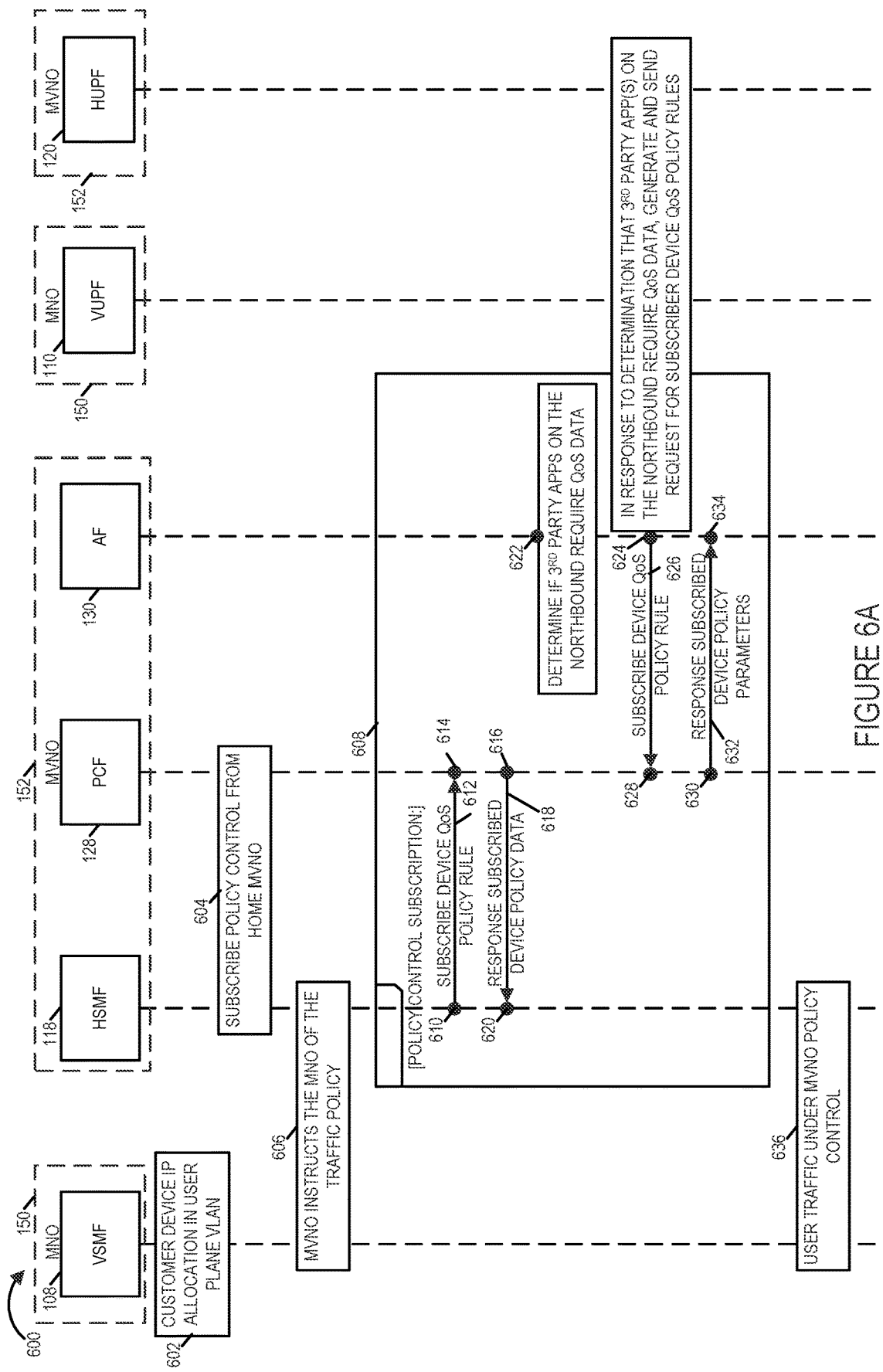
FIG. 6A is a first part of a drawing of an exemplary signaling diagram illustrating an exemplary method and signaling flow to provide policy control to a roaming customer device via home MVNO network policy, e.g., Charter MVNO network policy, but executed by the MVNO hosting network, e.g., the MNO Verizon network, in accordance with an exemplary embodiment.
Figure 6B:
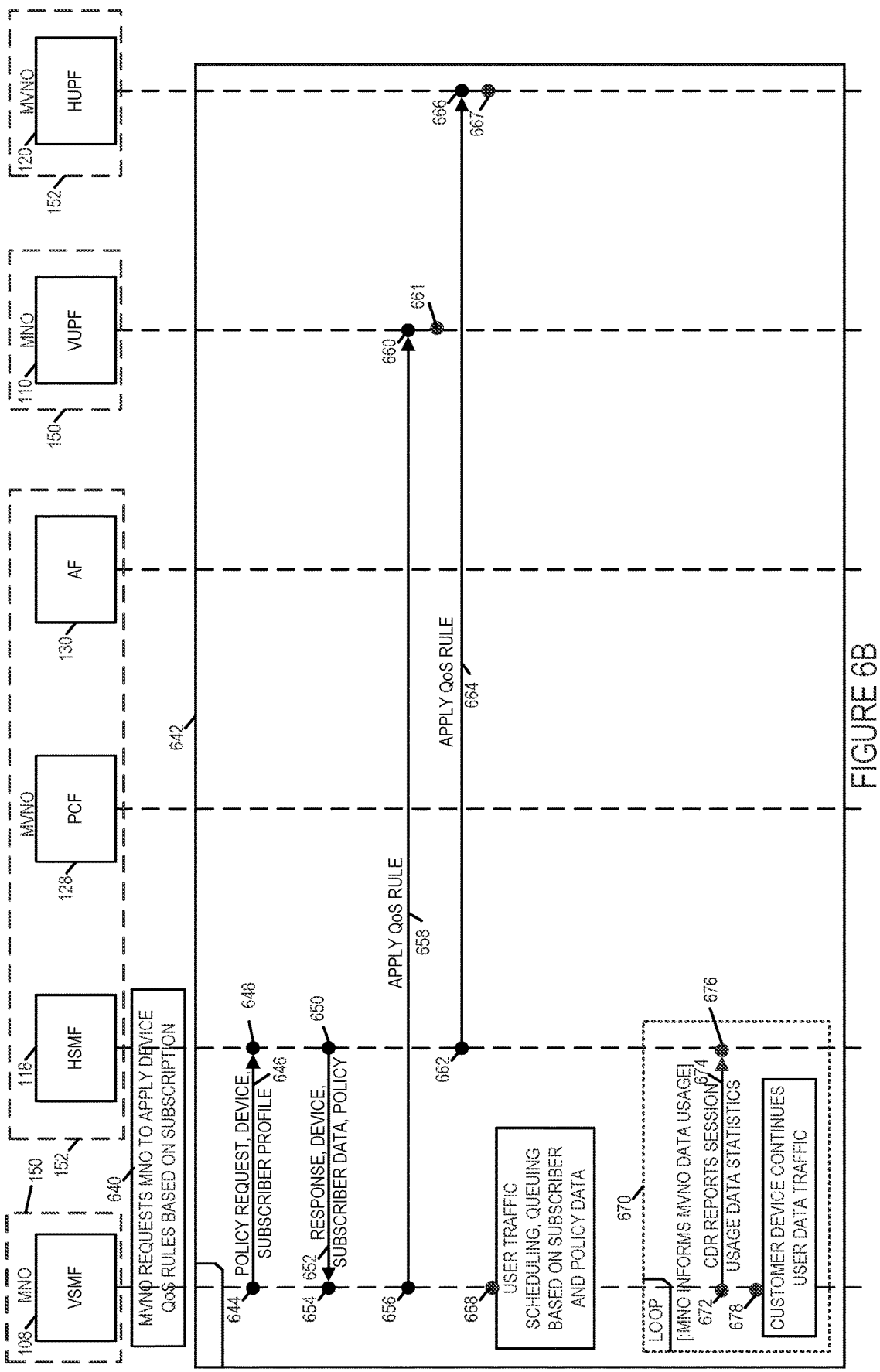
FIG. 6B is a second part of a drawing of an exemplary signaling diagram illustrating an exemplary method and signaling flow to provide policy control to a roaming customer device via home MVNO network policy, e.g., Charter MVNO network policy, but executed by the MVNO hosting network, e.g., the MNO Verizon network, in accordance with an exemplary embodiment.

FIG. 6, comprising the combination of FIG. 6A and FIG. 6B, is drawing 600 of an exemplary signaling diagram illustrating an exemplary method and signaling flow to provide policy control to a roaming customer device via home MVNO network policy, e.g., Charter MVNO network policy, but executed by the MVNO hosting network, e.g. the MNO Verizon network, in accordance with an exemplary embodiment.

Block 602 indicates the customer device 102 has an IP allocation in the user plane VLAN being managed by VSMF 108. Block 604 indicates that subscriber policy control for customer device 102 is from the home MVNO. Block 606 indicates that the MVNO instructs the MNO of the traffic policy.

Block 608 illustrates exemplary policy control subscription information distribution. In step 610 the HSMF 118 sends the PCF 128 a request 612 for subscribed device Quality of Service (QoS) policy rules. In step 614 the PCF 128 receives the request, and in response in step 616 the PCF 128 sends a response 618 including subscribed device policy data. In step 622 the applications function (AF) 130 determines if 3rd party APPs on the northbound require QoS data. In step 624, in response to a determination that 3rd party App(s) on the northbound require QoS data, the AF 130 generates and sends a request 626 for subscriber device QoS policy rules to PCF 128. In step 628, the PCF 128 receives the request 626 for subscriber device QoS policy rules, and in response in step 630, the PCF 128 sends response 632 including subscribed device policy parameters to AF 130. The response 632 is received in step 634 by the AF 130 and the recovered subscribed device policy parameters are subsequently used by the AF in implementing traffic policy with regard to the customer device 102 traffic.

Block 636 indicates the user traffic for the customer device 102 is under both MVNO policy control. Both the VSMF and the HSMF 118 implement MVNO policy rules with regard to traffic for customer device 102. Block 640 indicates that the MVNO requests the MNO to apply device QoS rules based on subscription.

Block 642 illustrates exemplary subscriber data and policy rules, with regard to user traffic for the customer device, being communicated and being applied. In step 644 the VSMF 108 sends the HMSF 118 a policy request 646 corresponding to the customer device 102, said request requesting subscriber data and policy rule information. In step 648, the HSMF 118 receives the request 646, and in step 650 generates and sends response 652, including information identifying the customer device 102, subscriber data and policy information, to the VSMF 108. In step 654, the VSMF 108 receives the response 652 and recovers the communicated information.

In step 656, the VSMF 108 generates and sends apply QoS rule(s) message 658 to visiting network UPF (VUPF) 110, which is based on the subscription data and policy rules of the MVMO. In step 660 the VUPF 110 receives the message 658 and the UPF 110 is operated to apply the communicated QoS rules with regard to traffic for the customer device 102, e.g., with regard to the user traffic VLAN.

In step 662, the HSMF 108 generates and apply QoS rule(s) message 664 to home network UPF (HUPF) 120, which is based on the subscription data and policy rules of the HVMO. In step 666 the HUPF 120 receives the message 664 and the HUPF 120 is operated to apply the communicated QoS rules with regard to traffic for the customer device 102, e.g., with regard to the user traffic which traverses the MVNO.

In step 668 the VSMF 108 is operated to perform user traffic scheduling and queuing for customer device 102 based on subscriber and policy data, which was previously communicated from the MVNO to the MNO. The MNO, e.g., VSMF 108 of MNO network 150, tracks data usage and maintains call data records for customer device 102 with regard to user traffic through its network.

Block 670 indicates that the MNO informs the MVNO of data usage with regard to customer device 102, which is visiting the MNO and using the access point 104 of the MNO for communications as well as using the user traffic VLAN of the MNO under management of the VSMF 108. In step 672 the VSMF 108 generates and sends call data record (CDR) reports 674 including session usage data statistics for customer device 102 to HSMF 118. In step 676 the HSMF 118 receives the CDR reports 674 and stores the received information. In step 678 the customer device 102 continues user data traffic under management of VSMF 108. Block 670 operations are performed repetitively.

Figure 7A:
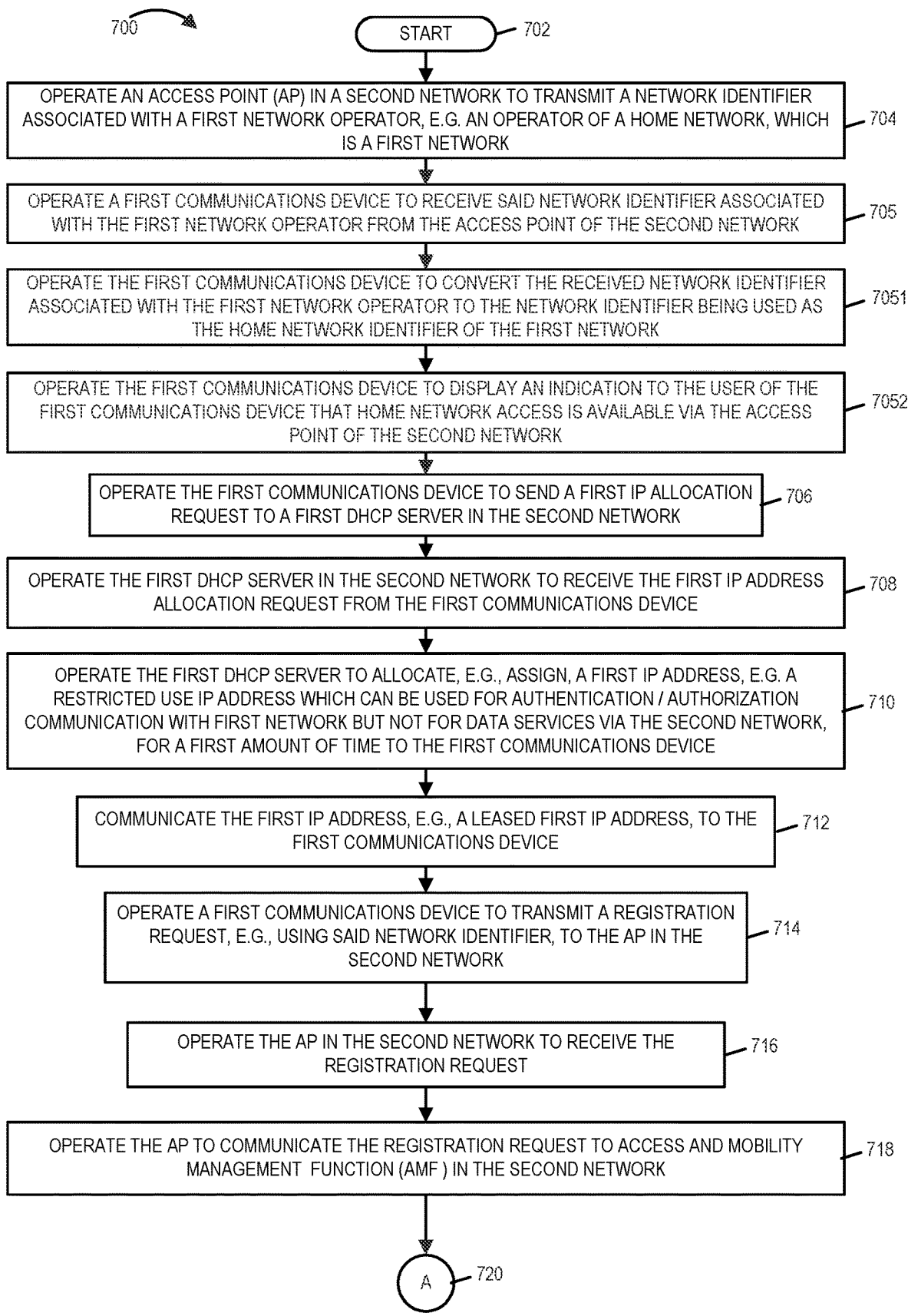
FIG. 7A is a first part of a flowchart of an exemplary method of operating a communications system, e.g., communications system, in accordance with an exemplary embodiment.
Figure 7B:
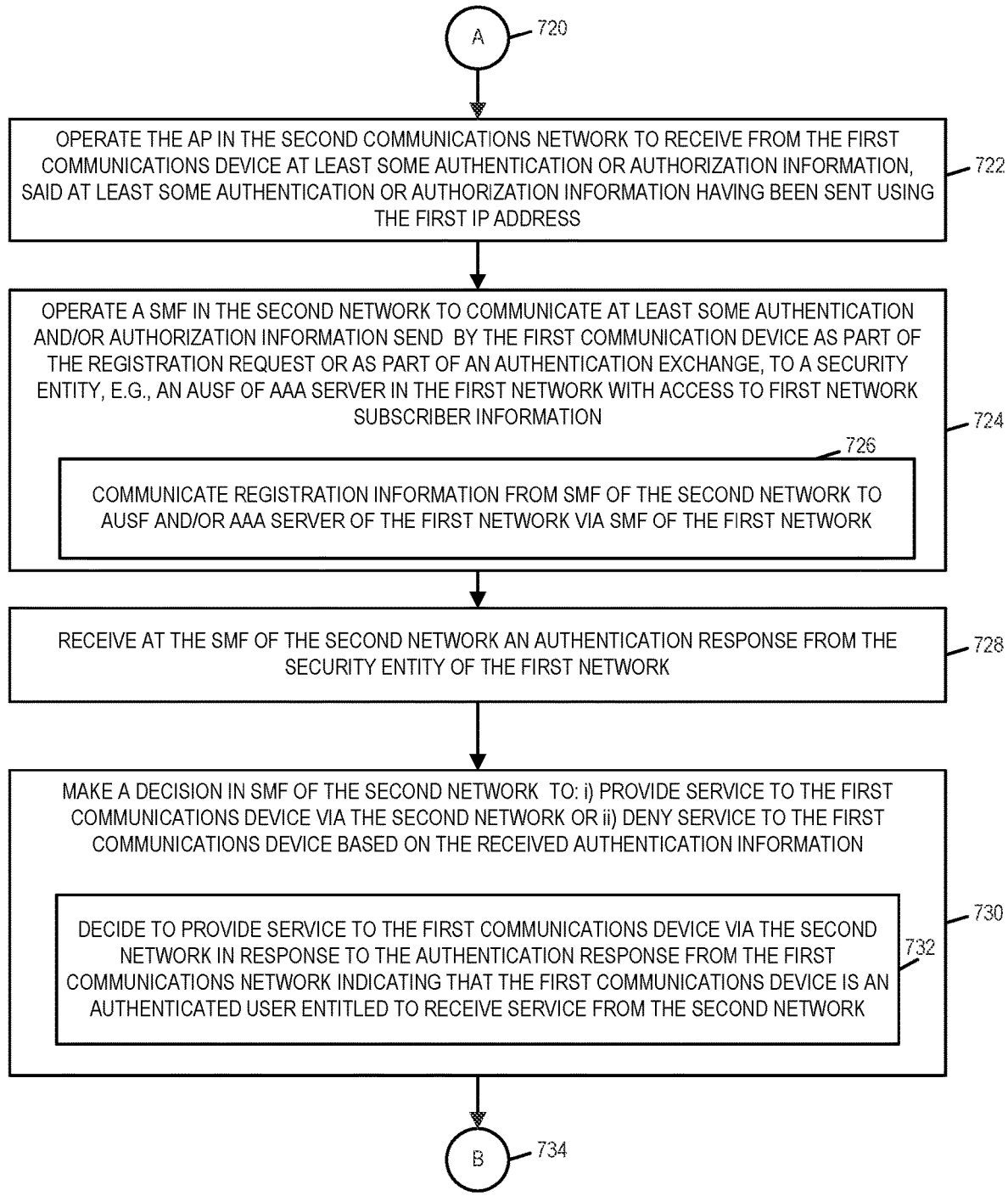
FIG. 7B is a second part of a flowchart of an exemplary method of operating a communications system, e.g., communications system, in accordance with an exemplary embodiment.

FIG. 7, comprising the combination of FIG. 7A, FIG. 7B and FIG. 7C, is a flowchart of an exemplary method of operating a communications system, e.g., communications system 100, in accordance with an exemplary embodiment.

Operation starts in step 702, in which the communications system is powered on and initialized. Operation proceeds from start step 702 to step 704.

In step 704 an access point (AP) in a second network, (e.g., a cellular base station or other base station, e.g. a WiFi base station, in a visited network such as a Mobile Network Operator (MNO) network) is operated to transmit, e.g. broadcast, a network identifier (e.g., a Public Land Mobile Network—Identifier (PLMN-ID) associated with a first network operator, e.g. an operator of a home network, which is a first network. For example, in step 704 the access point broadcasts a PLMN-ID including a Mobile Network Code (MNC)= to a predefined agreed value, e.g., "009" indicating "shared", e.g., indicating the AP 104 in the second network (MNO network 150) is operating as a sharing node, providing service to subscribers of a first network operator, e.g., a particular MVNO, with which the second network operator, e.g., the MNO has an agreement. The first network operator is, e.g., a Mobile Virtual Network Operator (MVNO) with a relationship with the operator of the second network, e.g., the MNO. In various embodiments, the relationship between the operators is such that subscribers to the first operator are able to receive service via network access points in the second network. In various embodiments, the agreement also specifies that authentication is to be provided by the first network, e.g., with the SMF of the second network acting as a relay device. A HSS or AUSF/UDM in the second network acts as a proxy device. In various embodiments, the agreement also specifies that first network is to provide first network subscriber device profile information and/or policy rules, e.g., data traffic policy rules to the second network, e.g., to be used by the SMF of the second network. The access point is, e.g., AP 104 in MNO network 150. The second network is, e.g., a MNO network, and the first network is, e.g., a MVNO network 152.

In some embodiments, said network identifier (e.g., mobile network code (MNC) value of a PLMN) associated with the first network operator is a value (e.g., "009") indicating the AP (104) of the second network is acting as a sharing node with regard to the first network. In some embodiments, said network identifier value (e.g., 009) associated with the first network operator is a different value from an MNC value associated with the first network operator which is broadcast by an AP of the first network. In some embodiments, said network identifier value (e.g., 009) associated with the first network operator is a different value from an MNC value associated only with the second network which is also being transmitted (broadcast) by the AP of the second network. In some embodiments, said network identifier (e.g., 009) associated with the first network operator which is transmitted by the AP of the second network is in addition to a network identifier (e.g., 010) associated with the second network operator (e.g., MNO=Verizon) which is transmitted by the AP of the second network. Operation proceeds from step 704 to step 705.

In step 705 the first communications device (102) is operated to receive said network identifier (e.g., MNC="009" of a received PLMN) associated with the first network operator from the access point (104) of the second network. Operation proceeds from step 705 to step 7051.

In step 7051 the first communications device (102) is operated to convert the received network identifier (e.g., "009") to the network identifier being used as the home network identifier of the first network (e.g., MNC of the home PLMN for the first communications device (e.g., H-MVNO MNC)). Operation proceeds from step 7051 to step 7052.

In step 7052 the first communications device is operated to display an indication to the user of the first communications device (102) that home network access (e.g., free WiFi coverage—in accordance with the sharing agreement) is available via the access point in the second network. Operation proceeds from step 7052 to step 706.

In step 706 the first communications device, e.g., cell phone 102, is operated to send a first IP allocation request to a first DHCP server in the second network. The first DHCP server is, e.g., DHCP server 1 401 in SMF 108 or UPF 110 of second network (MNO network) 150. The first communications device, e.g., cell phone 102 includes a SIM card 103 corresponding to the first network operator, e.g., a MVNO. Operation proceeds from step 706 to step 708.

In step 708 the first DHCP server (e.g., a DHCP server (401) in the SMF (108) or UPF (110) or AMF (106) of the second (e.g., visited) network) in the second network is operated to receive the first IP allocation request from the first communications device. Operation proceeds from step 708 to step 710.

In step 710 the first DHCP server (e.g., DHCP server 401) is operated to allocate, e.g., assign, a first IP address, e.g., a restricted use IP address which can be used for authentication/authorization communications with the first network but not data services with the second network, for a first amount of time to the first communications device. Operation proceeds from step 710 to step 712.

In step 712 the first IP address, e.g., a leased first IP address, is communicated to the first communications device. Operation proceeds from step 712 to step 714.

In step 714 the first communications device is operated to transmit a registration request, e.g., using said network identifier, to the AP in the second network. Operation proceeds from step 714 to step 716.

In step 716 the AP in the second network is operated to receive the registration request from the first communications device, e.g., cell phone 102 which may, and in some embodiments, does includes a single SIM card corresponding to the first network operator. In some embodiments, the received registration request signal received by the AP of the second network includes said network identifier (e.g., MNC="009" of a received PLMN ID) associated with the first network operator. In some embodiments, the network identifier is a shared network identifier. Operation proceeds from step 716 to step 718.

In step 718 the AP is operated to communicate the registration request to an access and mobility management function, e.g., AMF 106, in the second network. Operation proceeds from step 718, via connecting node A 720, to step 722.

In step 722 the AP in the second communications network is operated to receive from the first communications device at least some authentication or authorization information (e.g., first communications device credentials that may be, and sometimes are, in encrypted form) sent by the first communications device using the first IP address (e.g., the IP address assigned to the first communications device for authentication and authorization purposes) to communicate with a security entity in the first network. In various embodiments, the second communications network, e.g., SMF 108 in the second network, precludes the first IP address from being used for data service provided by the second communications network. In various embodiments, the first communications device uses the first IP address to communicate with a security entity (e.g., AUSF 122 or AAA server 134) in the first communications network as part of an authentication and authorization process. In some embodiments, the second communications network, e.g., SMF 108 in the second network, limits the communication associated with the first IP address to communication of one or more device in the first network associated with authentication, authorization or accounting functions relating to subscribers of service provided by the first network operator. Operation proceeds from step 722 to step 724.

In step 724 a SMF, e.g. SMF 108, in the second network is operated to communicate at least some authentication and/or authorization information (e.g., first communications device credentials that may be and sometimes are in encrypted form) sent by the first communications device as part of the registration request or as part of an authentication exchange, to a security entity in the first network, e.g., an AUSF 122 or AAA server 134 in the first network with access to the first network subscriber information, e.g. in UDM 124. Step 724 includes step 726 in which the SMF 108 of the second network communicates registration information to an AUSF 122 and/or an AAA 134 of the first network via a SMF 118 of the first network. Operation proceeds from step 724 to step 728.

In step 728 the SMF, e.g., SMF 108, of the second network is operated to receive an authentication response from the security entity, e.g., AUSF 122 or AAA server 134, in the first network. Operation proceeds from step 728 to step 730.

In step 730 the SMF of the second network makes a decision to i) provide service to the first communications device via the second (e.g., visited) network or ii) deny service to the first communications device based on the received authentication information. Step 730 includes step 732. In step 732 the SMF of the second network decides to provide service to the first communications device via the second network in response to the authentication response for the first communications network indicating that the first communications device is an authenticated user entitled to receive service from the second network (e.g. by virtue of the first communications device corresponding to a subscription to a service provided by the first network operator which entitles the first communications device to receive service from the second communications network when visiting the second communications network). Operation proceeds from step 730, via connecting node B 734, to step 736.

In step 736, a second DHCP server (e.g., DHCP server (401 or 403) in the SMF (108) or UPF (110) of second (e.g. visited) network), in the second network is operated to receive a second IP address allocation request from the first communications device following successful authentication of the first communications device by the security entity or entities in the first communications network, said second DHCP server being the same DHCP server or another DHCP server in the second network. (The second network may use the same or a different DHCP server for assignment of second addresses used for data communications than is used for first DHCP addresses used for authentication and/or authorization via a security device in the first communications network.) Operation proceeds from step 736 to step 738.

In step 738 the second DHCP server in the second network is operated to assign a second IP address to the first communications device (e.g., an Ip address which is to be used by the first communications device for data communications services provided by the second (visited) communications network. Operation proceeds from step 738 to step 740.

In step 740 the SMF in the second network is operated to receive traffic policy information to be applied to data traffic corresponding to the first communications device when obtaining data traffic services from the first communications network from a policy control function in the first communications network. Operation proceeds from step 740 to step 742.

In step 742 the SMF in the second network is operated to send traffic policy control rules to be applied to data traffic corresponding to the first communications device to a UPF in the second communications network. Operation proceeds from step 742 to steps 744 and 746.

In step 744 the SMF in the second network is operated to apply the user traffic policy control rules (e.g., maximum data rate restrictions) to data traffic communicated through the second communications network by the first communications device using the second IP address which was assigned to the first communications device for use in communicating data traffic through the second communications network.

In step 746 the UPF in the second network is operated to apply the user traffic policy control rules (e.g., maximum data rate restrictions) to data traffic communicated through the second communications network by the first communications device using the second IP address which was assigned to the first communications device for use in communicating data traffic through the second communications network. Operation proceeds from steps 744 and 746 to step 748.

In step 748 the SMF (108) in the second network is operated to communicate data usage information corresponding to the first communications device (102) to the SMF (118) in the first communications network. In some embodiments, the data usage information includes CDR (customer data records) corresponding to the first communications device (102) relating to data traffic communicated to or from the first communications device through the access point (104) in the second communications network (e.g., data traffic corresponding to the first communications device (102) which traverses the second communications network (but which may or may not traverse the first communications network)).

In some embodiments, authentication and authorization information (e.g., SUPI 140) for the first communications device (102) is stored in the first network (e.g., in UDM 124) and relates to a service subscription (e.g. subscription data 142) which entitles the first communications device (102) to receive services provided by the first network operator (e.g., directly via the network operated by the first network operator or via contractual agreement for services between the first network operator and a second network operator which operates the second network). In some embodiments, the second network (e.g., visited network) does not store service subscription information, authentication, and/or authorization information corresponding to the first communications device (102) prior to authentication by the security device (122 or 134) of the first communications network. In some embodiments, the first communications device (102) includes a single SIM card corresponding to the first operator network.

Figure 8:
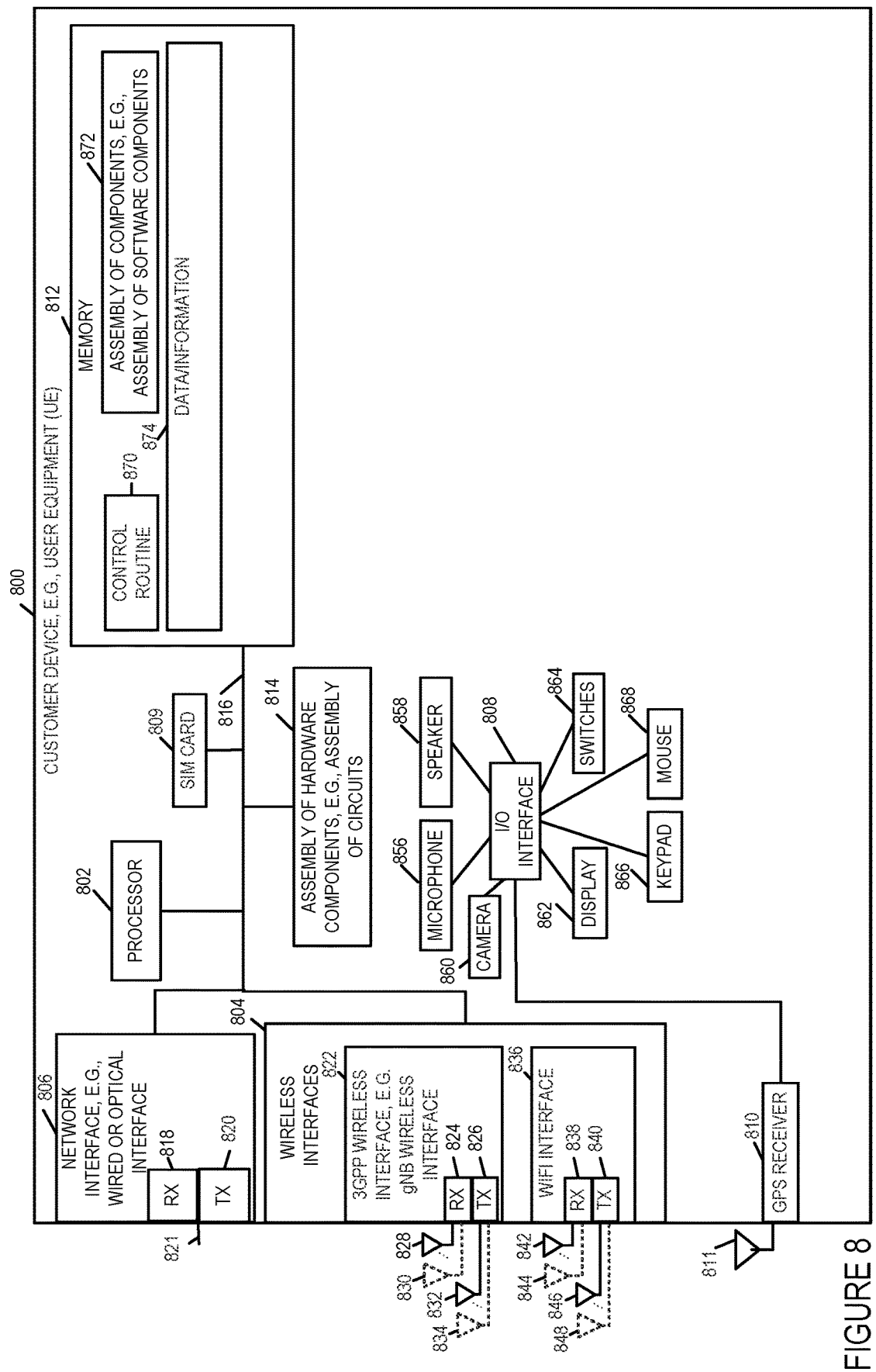
FIG. 8 is a drawing of an exemplary customer communications device, e.g., a user equipment (UE) device, in accordance with an exemplary embodiment.

FIG. 8 is a drawing of an exemplary customer communications device 800, e.g., a user equipment (UE) device, in accordance with an exemplary embodiment. Customer device 800 is, e.g., customer device 102 shown and/or described with respect to any of FIGS. 1-7.

Customer device 800 includes a processor 802, e.g., a CPU, wireless interfaces 804, a network interface 906, an I/O interface 808, a SIM card 809, a GPS receiver 810, memory 812, and an assembly of hardware components 814, e.g., an assembly of circuits, coupled together via a bus 816 over which the various elements may interchange data and information. Wireless interface 804 includes a 3PP wireless interface, e.g., a gNB wireless interface 822 and a WiFi interface 836. 3GPP wireless interface 822 includes a wireless receiver 824 and a wireless transmitter 826. Wireless receiver 824 is coupled to one or more receive antennas or antenna elements (828, . . . 830) via which the customer device 800 may receive wireless signals, e.g., from a gNB base station. Wireless transmitter 826 is coupled to one or more transmitter antennas or antenna elements (832, . . . 834) via which the customer device 800 may transmit wireless signals, e.g., to a gNB base station.

WiFi interface 836 includes a wireless receiver 838 and a wireless transmitter 840. Wireless receiver 838 is coupled to one or more receive antennas or antenna elements (842, . . . 844) via which the customer device 800 may receive wireless signals, e.g., from a WiFi AP. Wireless transmitter 840 is coupled to one or more transmitter antennas or antenna elements (846, . . . 848) via which the customer device 800 may transmit wireless signals, e.g., to a WiFi AP.

Network interface 806, e.g., a wired or optical interface, includes a receiver 818 and a transmitter 820 coupled to interface connector 821, via which the customer device 800 may communicate with other nodes via a wired or optical communications link.

Customer device 800 further includes a plurality of I/O devices (microphone 856, speaker 858, camera 860, display 862, e.g., a touch screen display, switches 864, keypad 866 and mouse 868) coupled to I/O interface 808, via which the various I/O devices are coupled to bus 816 and other elements of customer device 800.

GPS receiver 810 is coupled to GPS antenna 811, which receives GPS signals from GPS satellites. GPS receiver determines time, acceleration, velocity, position and altitude based on received GPS signals.

Memory 812 includes a control routine 870, an assembly of components 872, e.g., an assembly of software components, e.g., routines, modules, sub-routines, applications, etc. and data/information 874.

Figure 9:
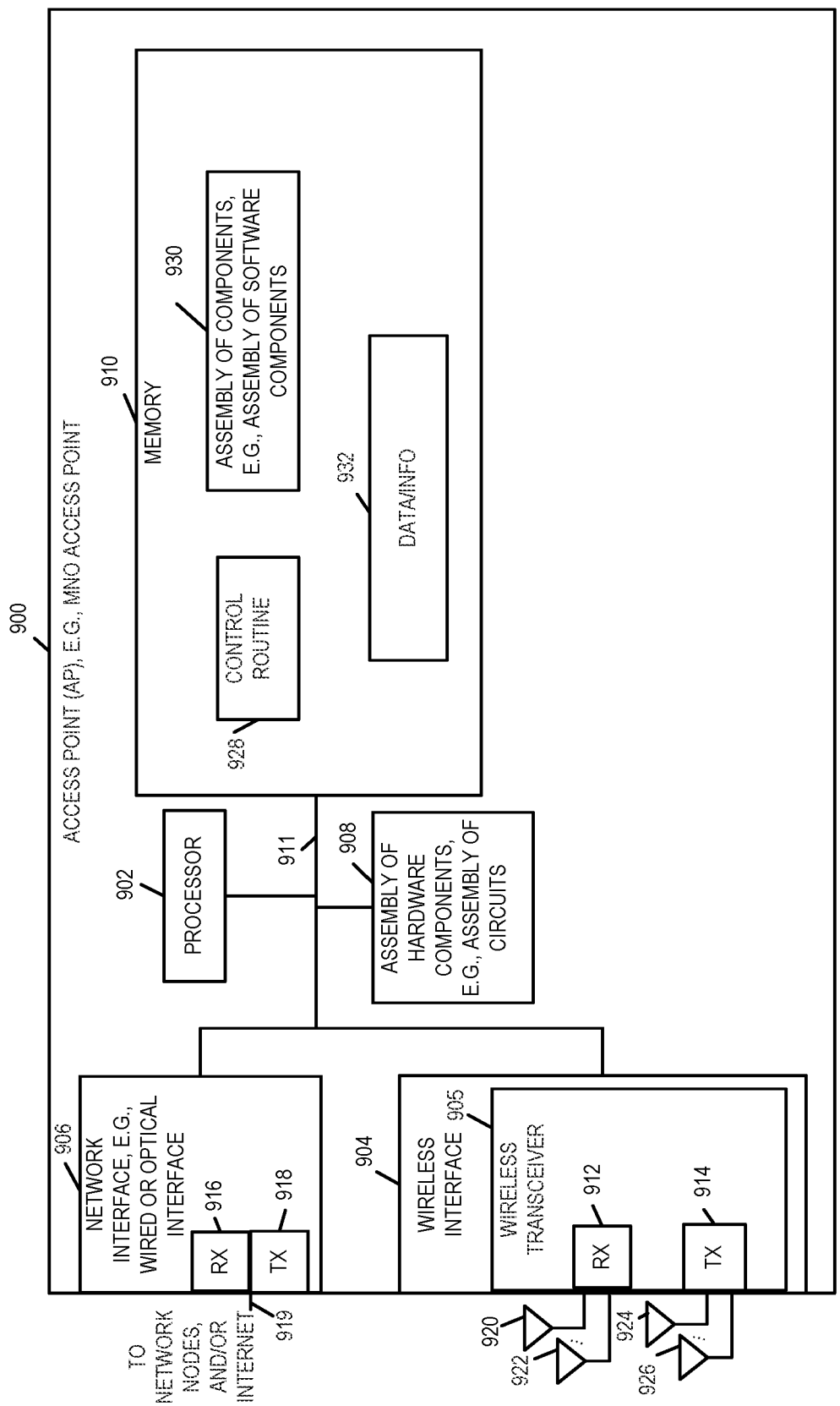
FIG. 9 is drawing of an exemplary access point (AP), e.g., a MNO access point, in accordance with an exemplary embodiment.

FIG. 9 is drawing of an exemplary access point (AP) 900, e.g., a MNO access point, in accordance with an exemplary embodiment. Exemplary access point 900 is, e.g., AP 104 of FIG. 1 or AP 204 Of FIG. 2.

Access point 900 includes a processor 902, e.g., a CPU, a wireless interface 904, a network interface 906, an assembly of hardware components 908, e.g., an assembly of circuits, and memory 910 coupled together via a bus 911 over which the various elements may interchange data and information. Wireless interface 904 includes a wireless receiver 912 and a wireless transmitter 914. The wireless receiver 912 is coupled to one or more antennas or antenna elements (920, . . . , 922) via which the AP 900 may receive wireless signals from customer devices, e.g., UEs. The wireless transmitter 914 is coupled to one or more antennas or antenna elements (924, . . . , 926) via which the AP 900 may transmit wireless signals to customer device, e.g., UE. In some embodiments the wireless receiver 912 and the wireless transmitter are part of a wireless transceiver. In some embodiments, one or more antennas or antenna elements are used by both the wireless receiver 912 and the wireless transmitter 914. Network interface 906, e.g., a wired or optical interface, includes a receiver 916 and a transmitter 918 coupled to an interface connector 919 via which the AP 900 may be coupled to network node and/or the Internet.

Memory 910 includes a control routine 928, an assembly of components 930, e.g., an assembly of software components, e.g., routines, sub-routines, modules, applications, etc., and data/information 932.

Figure 10:
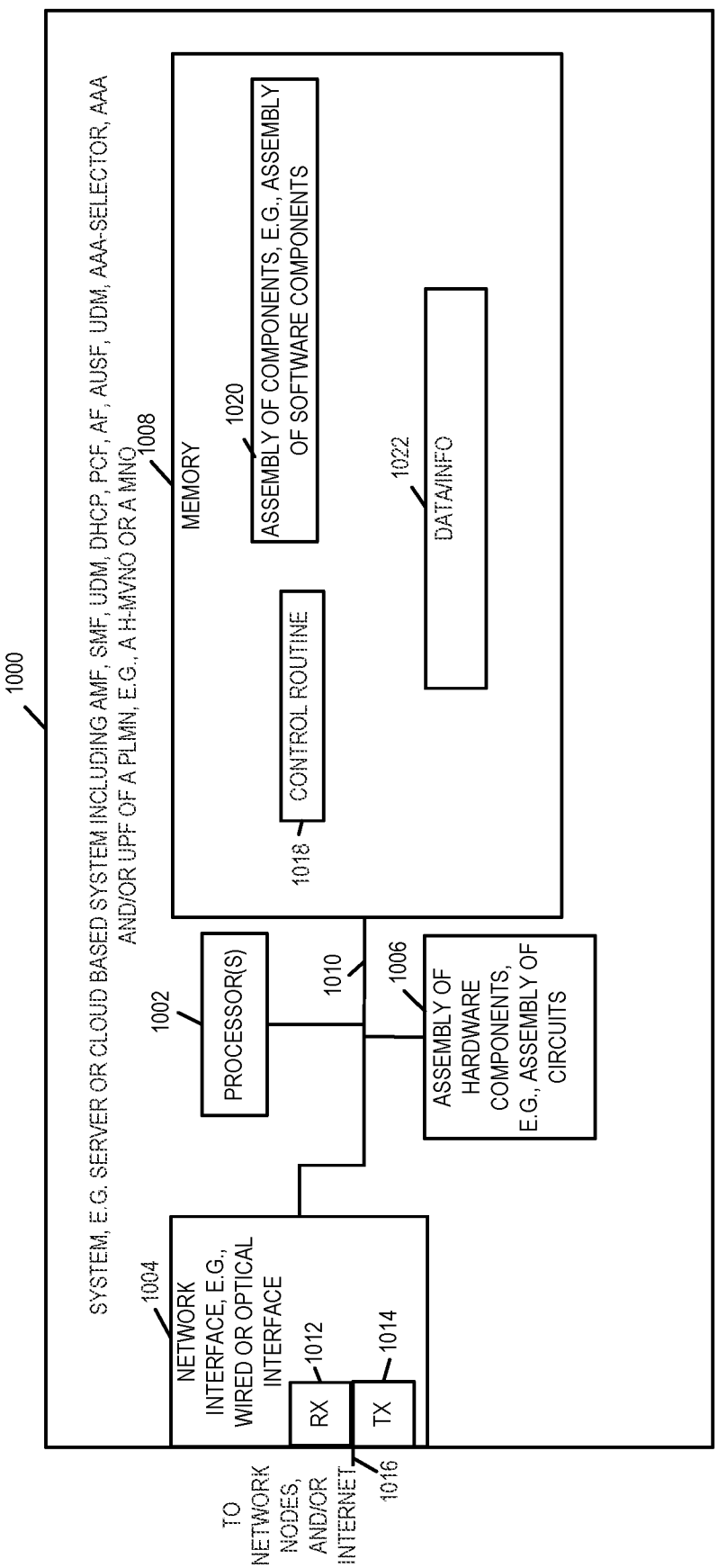
FIG. 10 is a drawing of an exemplary system, e.g., a server or cloud based system including AMF, SMF, UDM, DHCP, PCF, AF, AUSF, UDM, AAA-selector, AA servers, and/or a UPF of a PLMN, e.g. a H-MVNO or a MNO.

FIG. 10 is a drawing of an exemplary system 1000, e.g., a server or cloud based system including AMF, SMF, UDM, DHCP, PCF, AF, AUSF, UDM, AAA-selector, AA servers, and/or a UPF of a PLMN, e.g. a H-MVNO or a MNO.

Exemplary system 1000 includes a processor(s) 1002, a network interface 1004, e.g., a wired or optical interface, an assembly of hardware components 1006, e.g., an assembly of circuits, and memory 1008 coupled together via bus 1010 over which the various elements may interchange data and information. Network interface 1004 includes a receiver 1012 and a transmitter 1014 coupled to interface connector 1016 via which the system 1000 may be coupled to network nodes and/or the Internet. Memory 1008 includes a control routine 1018, an assembly of components, e.g., an assembly of software components, e.g., routines, sub-routines, modules, applications, etc., and data/information 1022.

Figure 11:
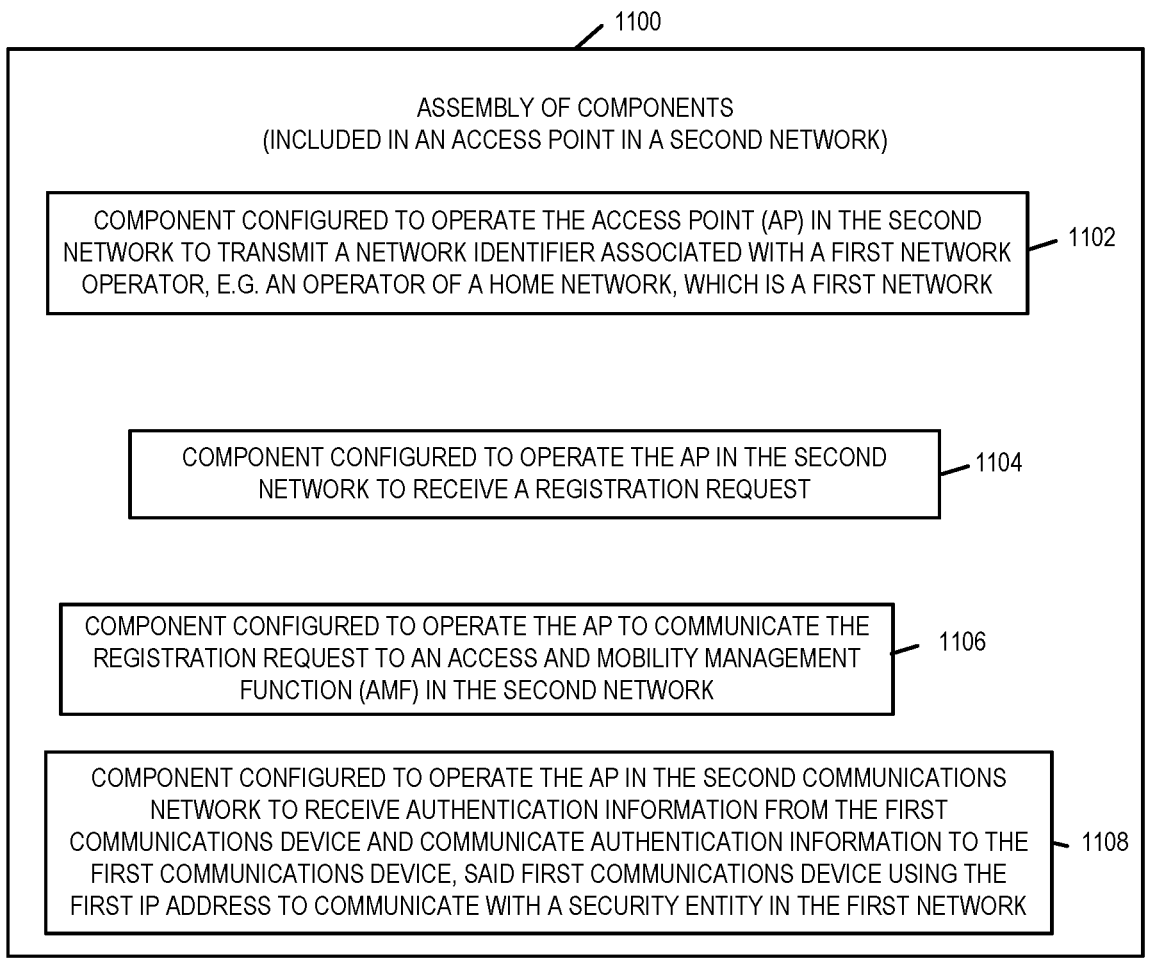
FIG. 11 is a drawing of an exemplary assembly of components which may be included in an exemplary network access point in a second network, e.g., a MNO network, in accordance with an exemplary embodiment.

FIG. 11 is a drawing of an exemplary assembly of components 1100 which may be included in an exemplary network access point, e.g., AP 104 or AP 204, in a second network, and/or AP 900 in accordance with an exemplary embodiment.

The components in the assembly of components 1100 can be, and in some embodiments are, implemented fully in hardware within a processor, e.g., processor 902, e.g., as individual circuits. The components in the assembly of components 1100 can be, and in some embodiments are, implemented fully in hardware within the assembly of hardware components 908, e.g., as individual circuits corresponding to the different components. In other embodiments some of the components are implemented, e.g., as circuits, within processor 902 with other components being implemented, e.g., as circuits within assembly of components 908, external to and coupled to the processor 902. As should be appreciated the level of integration of components on the processor and/or with some components being external to the processor may be one of design choice. Alternatively, rather than being implemented as circuits, all or some of the components may be implemented in software and stored in the memory 910 of the access point 900, with the components controlling operation of access point 900 to implement the functions corresponding to the components when the components are executed by a processor e.g., processor 902. In some such embodiments, the assembly of components 1100 is included in the memory 910 as part of an assembly of software components 930. In still other embodiments, various components in assembly of components 1100 are implemented as a combination of hardware and software, e.g., with another circuit external to the processor providing input to the processor which then under software control operates to perform a portion of a component's function.

When implemented in software the components include code, which when executed by a processor, e.g., processor 902, configure the processor to implement the function corresponding to the component. In embodiments where the assembly of components 1100 is stored in the memory 910, the memory 910 is a computer program product comprising a computer readable medium comprising code, e.g., individual code for each component, for causing at least one computer, e.g., processor 902, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 11 control and/or configure the access point 900 or elements therein such as the processor 902, to perform the functions of corresponding steps illustrated in the signaling diagrams and/or described with respect to any of the Figures. Thus, the assembly of components 1100 includes various components that perform functions of corresponding one or more described and/or illustrated steps of an exemplary method, e.g., steps of the method of signaling diagram 300 of FIG. 3, signaling diagram 400 of FIG. 4, and/or steps of the method of flowchart 700 of FIG. 7.

Assembly of components 1100 includes a component 1102 configured to operate the access point (AP) in the second network to transmit a network identifier associated with a first network operator, e.g. an operator of a home network, which the first network, a component 1104 configured to operate the AP in the second network to receive a registration request, a component 1106 configured to operate the AP to communicate the registration request to an access and mobility management function (AMF) in the second network, and a component 1108 configured to operate the AP in the second communications network to receive authentication information from the first communications device and communicate authentication information to the first communications device, said first communications device using the first IP address to communicate with a security entity in the first network.

Figure 12:
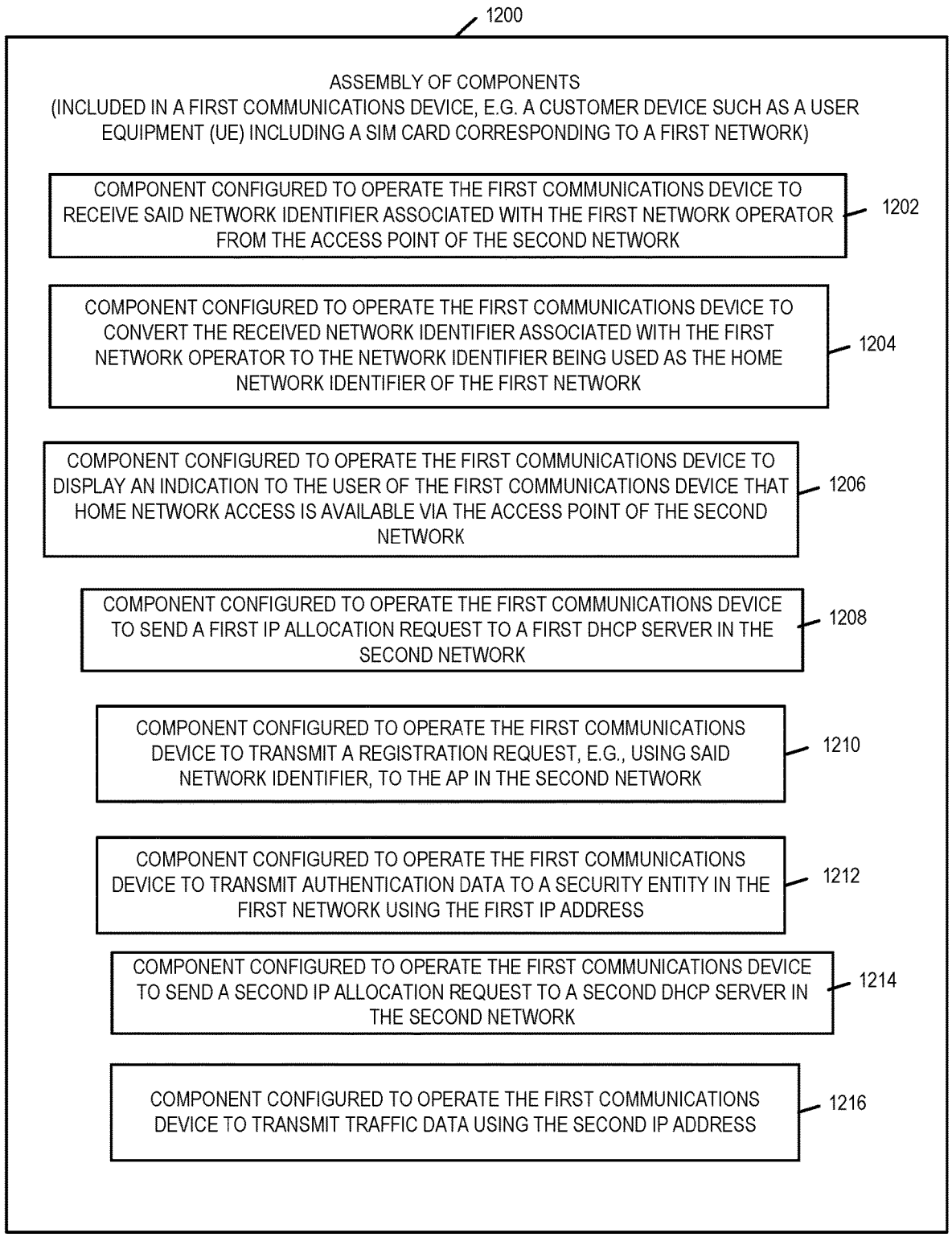
FIG. 12 is a drawing of an assembly of components which may be included in a first communications device, e.g., a customer communications device such as a user equipment (UE) device including a SIM card corresponding to a first network, in accordance with an exemplary embodiment.

FIG. 12 is a drawing of an assembly of components 1200 which may be included a first communications device, e.g., a customer device such as a user equipment (UE) device including a SIM card corresponding to a first network. The first communications device including assembly of components 1200 is, e.g., cell phone 102 including SIM card 103 corresponding to a MVNO, e.g., H-MVNO 152, and/or customer communications device 800, e.g., a UE including SM card 809.

The components in the assembly of components 1200 can be, and in some embodiments are, implemented fully in hardware within a processor, e.g., processor 802, e.g., as individual circuits. The components in the assembly of components 1200 can be, and in some embodiments are, implemented fully in hardware within the assembly of hardware components 814, e.g., as individual circuits corresponding to the different components. In other embodiments some of the components are implemented, e.g., as circuits, within processor 802 with other components being implemented, e.g., as circuits within assembly of components 814, external to and coupled to the processor 802. As should be appreciated the level of integration of components on the processor and/or with some components being external to the processor may be one of design choice. Alternatively, rather than being implemented as circuits, all or some of the components may be implemented in software and stored in the memory 812 of the customer communications device 800, with the components controlling operation of device 800 to implement the functions corresponding to the components when the components are executed by a processor e.g., processor 802. In some such embodiments, the assembly of components 1200 is included in the memory 812 as part of an assembly of software components 872. In still other embodiments, various components in assembly of components 1200 are implemented as a combination of hardware and software, e.g., with another circuit external to the processor providing input to the processor which then under software control operates to perform a portion of a component's function.

When implemented in software the components include code, which when executed by a processor, e.g., processor 802, configure the processor to implement the function corresponding to the component. In embodiments where the assembly of components 1200 is stored in the memory 812, the memory 812 is a computer program product comprising a computer readable medium comprising code, e.g., individual code for each component, for causing at least one computer, e.g., processor 802, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 12 control and/or configure the customer communications device 800 or elements therein such as the processor 802, to perform the functions of corresponding steps illustrated in the signaling diagrams and/or described with respect to any of the Figures. Thus, the assembly of components 1200 includes various components that perform functions of corresponding one or more described and/or illustrated steps of an exemplary method, e.g., steps of the method of signaling diagram 300 of FIG. 3, signaling diagram or 400 of FIG. 4, and/or steps of the method of flowchart 700 of FIG. 7.

Assembly of components 1200 includes a component 1202 configured to operate the first communications device to receive said network identifier associated with the first network operator (e.g., MNC="009" of PLMN-ID) from the access point of the second network, a component 1204 configured to operate the first communications device to convert the received network identifier associated with the first network operator (e.g., MNC="009" of PLMN-ID) to the network identifier being used as the home network identifier of the first network (e.g., MNC value for the MVNO (first network operator MNC)), a component 1206 configured to operate the first communications device to display an indication to the user of the first communications device that home network access is available via the access point of the second network, a component 1208 configured to operate the first communications device to send a first IP allocation request to a first DHCP in the second network, and a component 1210 configured to operate the first communications device to transmit a registration request, e.g. using said network identifier (indicating the AP is operating as a shared node with regard to another network (first network), to the AP in the second network, a component 1212 configured to operate the first communications device to transmit authentication information (e.g., credentials) directed to a security entity in the first network using the first IP address, a component 1214 configured to operate the first communications device to send a second IP allocation request to a second DHCP server in the second network, and a component 1216 configured to operate the first communications device to transmit traffic data using the second IP address allocated to the first communication device by the second DHCP server in the second network.

Figure 13:
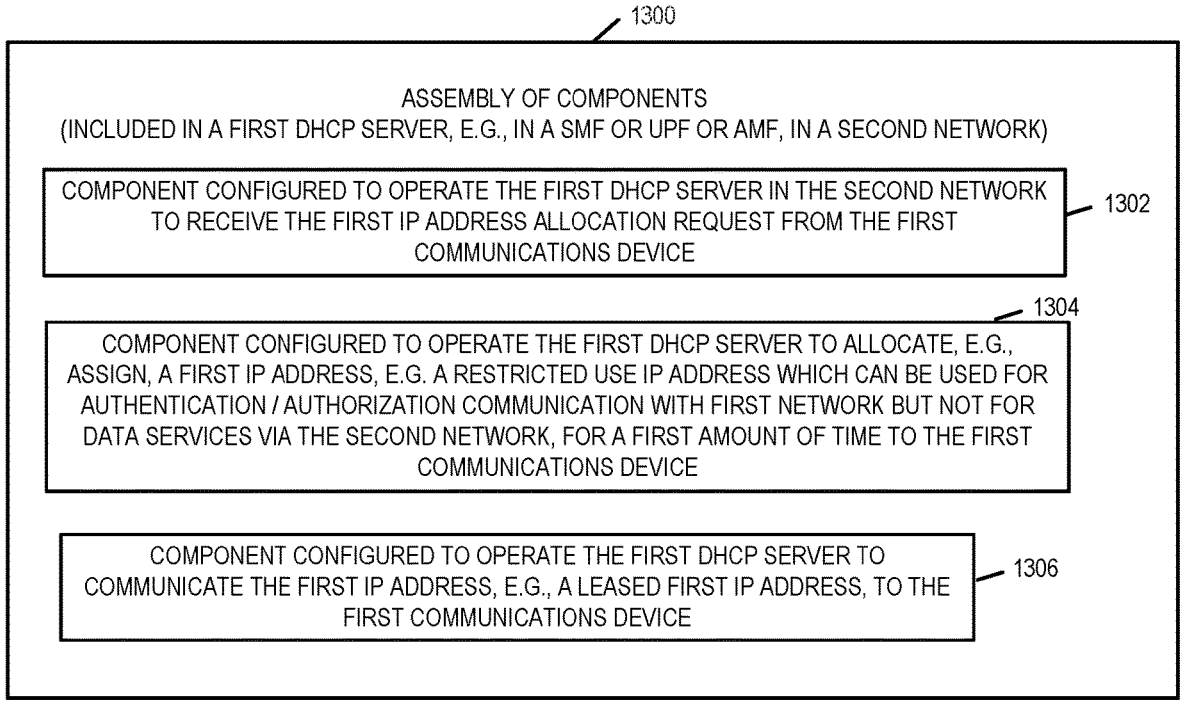
FIG. 13 is a drawing of an assembly of components, which may be included in a first DHCP server, e.g., in a SMF or UPF or AMF, in a second network, in accordance with an exemplary embodiment.

FIG. 13 is a drawing of an assembly of components 1300 which may be included in a first DHCP server, e.g., in a SMF or UPF, in a second network, in accordance with an exemplary embodiment. The first DHCP server including assembly of components 1300 is, e.g., DHCP server 1 401, shown in FIG. 4A and/or a DHCP server 1000 of FIG. 10.

The components in the assembly of components 1300 can be, and in some embodiments are, implemented fully in hardware within a processor, e.g., processor 1002, e.g., as individual circuits. The components in the assembly of components 1300 can be, and in some embodiments are, implemented fully in hardware within the assembly of hardware components 1006, e.g., as individual circuits corresponding to the different components. In other embodiments some of the components are implemented, e.g., as circuits, within processor 1002 with other components being implemented, e.g., as circuits within assembly of components 1006, external to and coupled to the processor 1002. As should be appreciated the level of integration of components on the processor and/or with some components being external to the processor may be one of design choice. Alternatively, rather than being implemented as circuits, all or some of the components may be implemented in software and stored in the memory 1008 of the DHCP server 1000, with the components controlling operation of DHCP server 1000 to implement the functions corresponding to the components when the components are executed by a processor e.g., processor 1002. In some such embodiments, the assembly of components 1300 is included in the memory 1008 as part of an assembly of software components 1020. In still other embodiments, various components in assembly of components 1300 are implemented as a combination of hardware and software, e.g., with another circuit external to the processor providing input to the processor which then under software control operates to perform a portion of a component's function.

When implemented in software the components include code, which when executed by a processor, e.g., processor 1002, configure the processor to implement the function corresponding to the component. In embodiments where the assembly of components 1300 is stored in the memory 1008, the memory 1008 is a computer program product comprising a computer readable medium comprising code, e.g., individual code for each component, for causing at least one computer, e.g., processor 1002, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 13 control and/or configure the DHCP server 1000 or elements therein such as the processor 1002, to perform the functions of corresponding steps illustrated in the signaling diagrams and/or described with respect to any of the Figures. Thus, the assembly of components 1300 includes various components that perform functions of corresponding one or more described and/or illustrated steps of an exemplary method, e.g., steps of the method of signaling diagram of signaling diagram 400 of FIG. 4, and/or steps of the method of flowchart 700 of FIG. 7.

Assembly of components 1300 includes a component 1302 configured to operate the first DHCP server in the second network to receive a first IP address allocation request from a first communications device, a component 1304 configured to operate the first DHCP server to allocate, e.g. assign, a first IP address, e.g. a restricted use IP address which can be used for authentication/authorization communication with a first network but not for data services via the second network, for a first amount of time to the first communications device, and a component 1306 configured to operate the first DHCP server to communicate the first IP address, e.g. a leased first IP address, to the first communications device.

Figure 14:
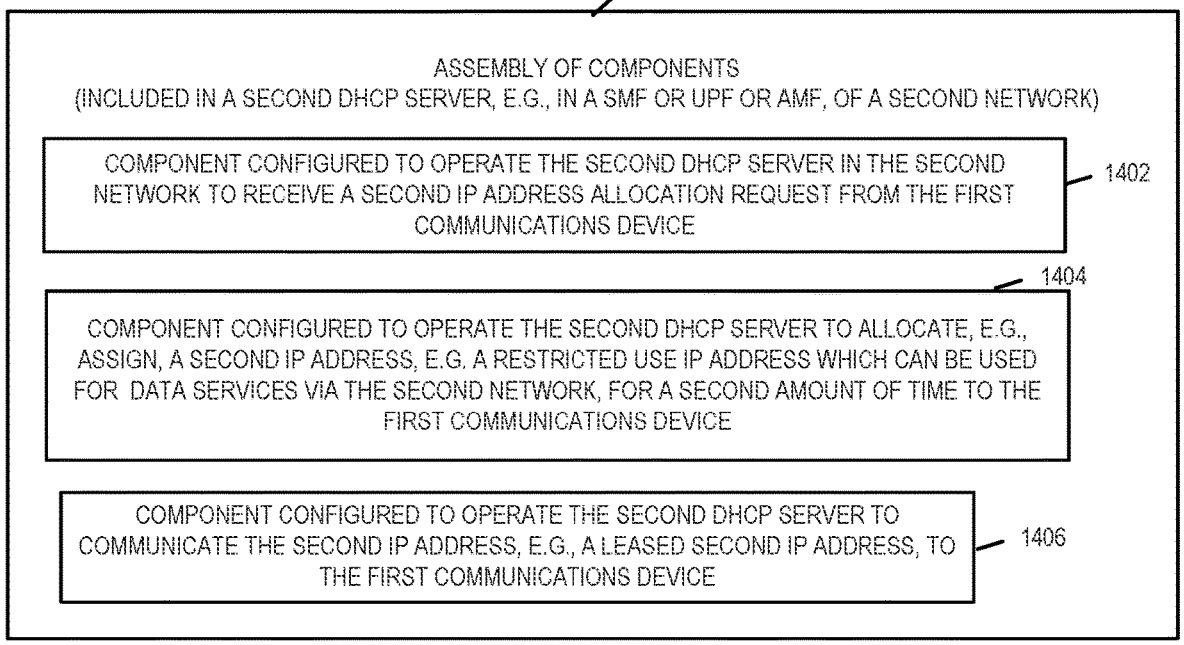
FIG. 14 is a drawing of an assembly of components which may be included in a second DHCP server, e.g., in a SMF or UPF or AMF, in a second network, in accordance with an exemplary embodiment.

FIG. 14 is a drawing of an assembly of components 1400 which may be included in a second DHCP server, e.g., in a SMF or UPF or AMF, in a second network, in accordance with an exemplary embodiment. The second DHCP server including assembly of components 1400 is, e.g., DHCP server 1 401 or DHCP server 403, shown in FIG. 4A and/or DHCP server 1000 of FIG. 10.

The components in the assembly of components 1500 can be, and in some embodiments are, implemented fully in hardware within a processor, e.g., processor 1002, e.g., as individual circuits. The components in the assembly of components 1000 can be, and in some embodiments are, implemented fully in hardware within the assembly of hardware components 1006, e.g., as individual circuits corresponding to the different components. In other embodiments some of the components are implemented, e.g., as circuits, within processor 1002 with other components being implemented, e.g., as circuits within assembly of components 1006, external to and coupled to the processor 1002. As should be appreciated the level of integration of components on the processor and/or with some components being external to the processor may be one of design choice. Alternatively, rather than being implemented as circuits, all or some of the components may be implemented in software and stored in the memory 1008 of the DHCP server 1000, with the components controlling operation of DHCP server 1000 to implement the functions corresponding to the components when the components are executed by a processor e.g., processor 1002. In some such embodiments, the assembly of components 1400 is included in the memory 1008 as part of an assembly of software components 1020. In still other embodiments, various components in assembly of components 1400 are implemented as a combination of hardware and software, e.g., with another circuit external to the processor providing input to the processor which then under software control operates to perform a portion of a component's function.

When implemented in software the components include code, which when executed by a processor, e.g., processor 1002, configure the processor to implement the function corresponding to the component. In embodiments where the assembly of components 1400 is stored in the memory 1008, the memory 1008 is a computer program product comprising a computer readable medium comprising code, e.g., individual code for each component, for causing at least one computer, e.g., processor 1002, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 14 control and/or configure the DHCP server 1000 or elements therein such as the processor 1002, to perform the functions of corresponding steps illustrated in the signaling diagrams and/or described with respect to any of the Figures. Thus, the assembly of components 1400 includes various components that perform functions of corresponding one or more described and/or illustrated steps of an exemplary method, e.g., steps of the method of signaling diagram of signaling diagram 400 of FIG. 4, and/or steps of the method of flowchart 700 of FIG. 7.

Assembly of components 1400 includes a component 1402 configured to operate the second DHCP server in the second network to receive a second IP address allocation request from a first communications device, a component 1404 configured to operate the second DHPC server to allocate, e.g. assign, a second IP address, e.g. a restricted use IP address which can be used for data services via the second network, for a second amount of time to the first communications device, and a component 1406 configured to operate the second DHCP server to communicate the second IP address, e.g. a leased second IP address, to the first communications device.

Figure 15A:
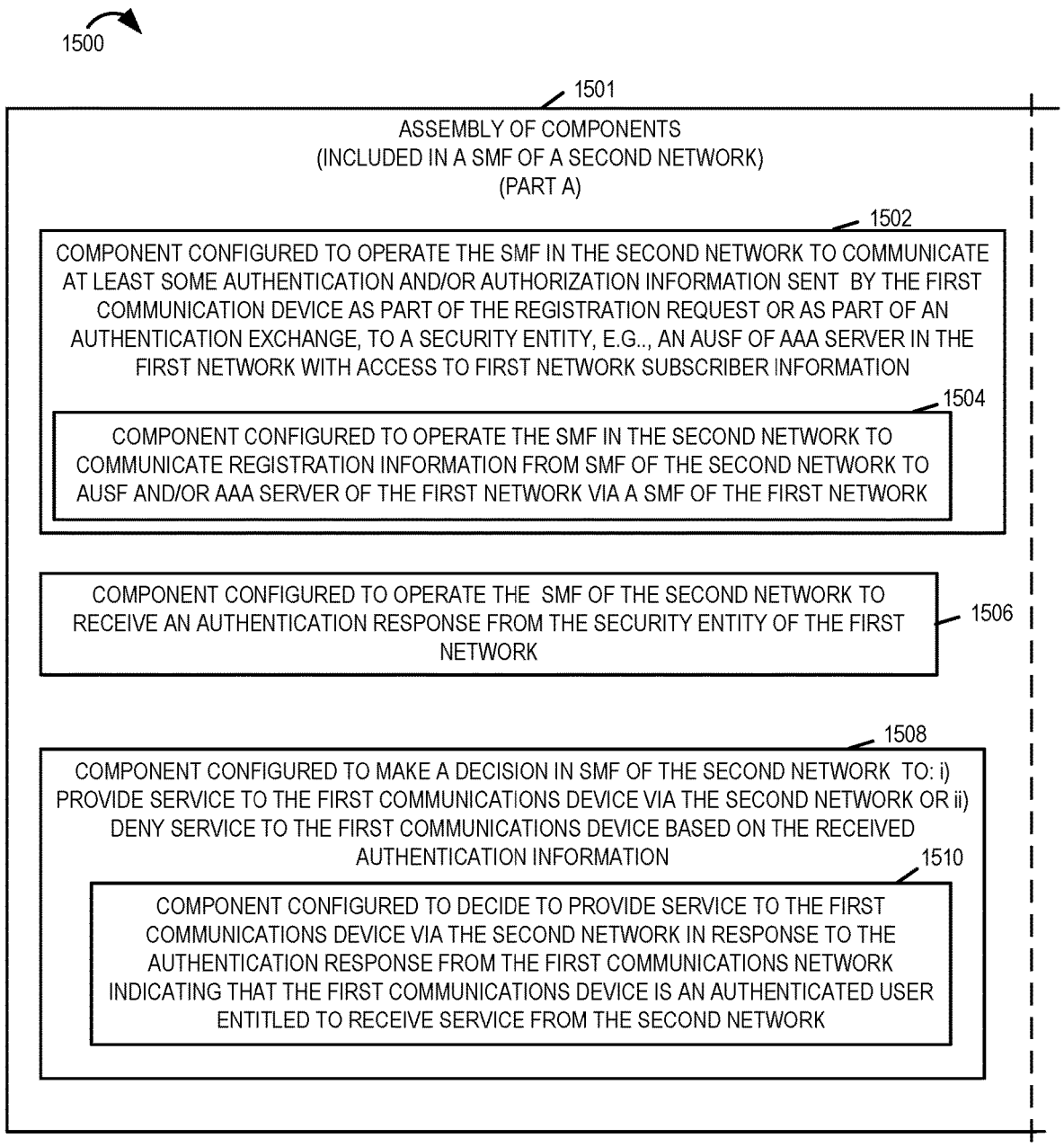
FIG. 15A is a first part of a drawing of an assembly of components 1500 which may be included in a SMF entity of a second network in accordance with an exemplary embodiment.
Figures 15, 15B:
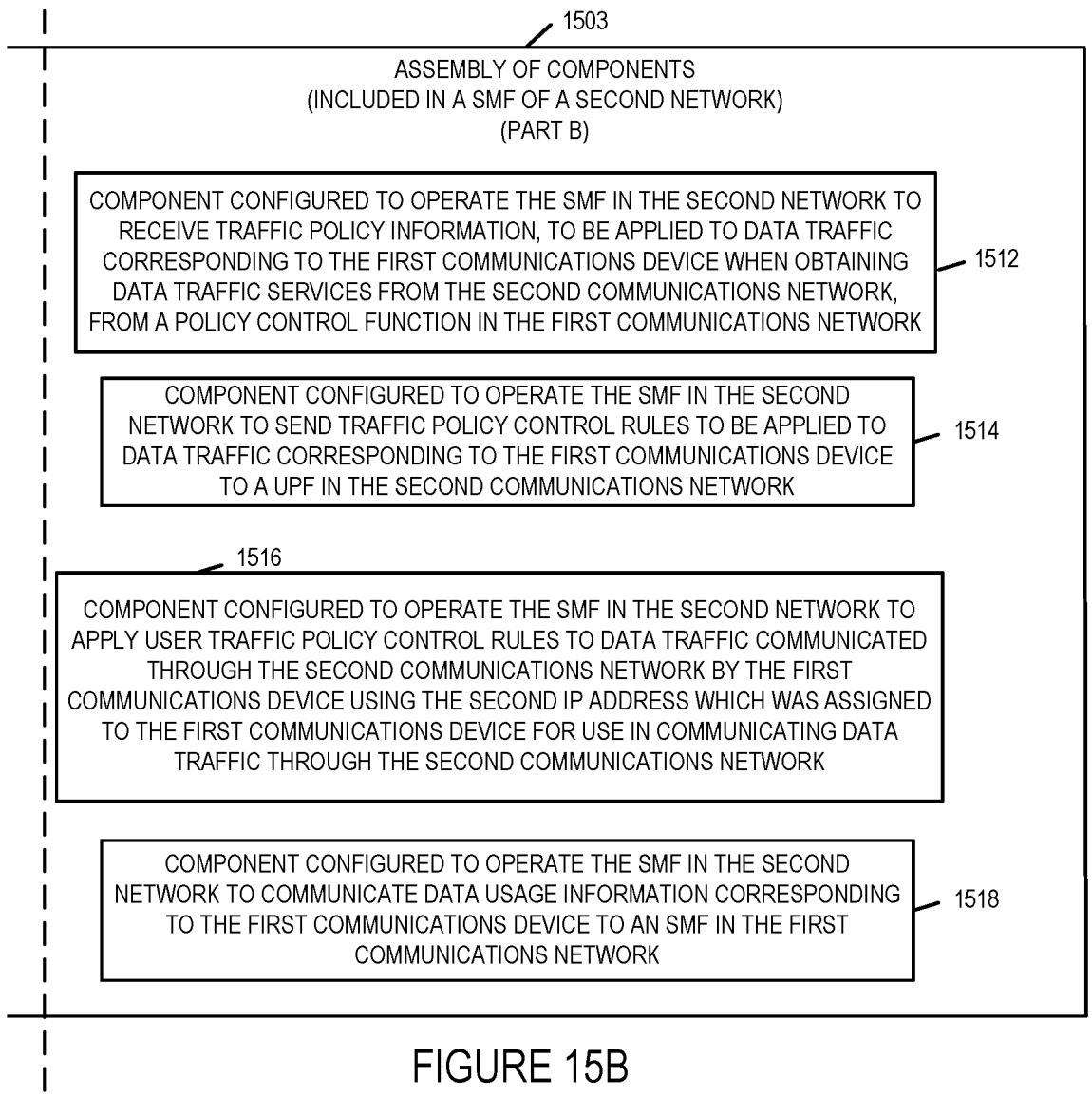
FIG. 15B is a second part of a drawing of an assembly of components 1500 which may be included in a SMF entity of a second network in accordance with an exemplary embodiment.
FIG. 15 comprises the combination of FIG. 15A and FIG. 15B.

FIG. 15, comprising the combination of FIG. 15A and FIG. 15B, is drawing of an assembly of components 1500, comprising the combination of Part A 1501 and Part B 1503, which may be included in a SMF of a second network in accordance with an exemplary embodiment. Assembly of components 1500 is, e.g., included in SMF 108 of second network 150 and/or SMF entity 1000 of FIG. 10.

The components in the assembly of components 1500 can be, and in some embodiments are, implemented fully in hardware within a processor, e.g., processor 1002, e.g., as individual circuits. The components in the assembly of components 1000 can be, and in some embodiments are, implemented fully in hardware within the assembly of hardware components 1006, e.g., as individual circuits corresponding to the different components. In other embodiments some of the components are implemented, e.g., as circuits, within processor 1002 with other components being implemented, e.g., as circuits within assembly of components 1006, external to and coupled to the processor 1002. As should be appreciated the level of integration of components on the processor and/or with some components being external to the processor may be one of design choice. Alternatively, rather than being implemented as circuits, all or some of the components may be implemented in software and stored in the memory 1008 of the SMF entity 1000, with the components controlling operation of SMF entity 1000 to implement the functions corresponding to the components when the components are executed by a processor e.g., processor 1002. In some such embodiments, the assembly of components 1500 is included in the memory 1008 as part of an assembly of software components 1020. In still other embodiments, various components in assembly of components 1500 are implemented as a combination of hardware and software, e.g., with another circuit external to the processor providing input to the processor which then under software control operates to perform a portion of a component's function.

When implemented in software the components include code, which when executed by a processor, e.g., processor 1002, configure the processor to implement the function corresponding to the component. In embodiments where the assembly of components 1500 is stored in the memory 1008, the memory 1008 is a computer program product comprising a computer readable medium comprising code, e.g., individual code for each component, for causing at least one computer, e.g., processor 1002, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 15 control and/or configure the SMF 1000 or elements therein such as the processor 1002, to perform the functions of corresponding steps illustrated in the signaling diagrams and/or described with respect to any of the Figures. Thus, the assembly of components 1500 includes various components that perform functions of corresponding one or more described and/or illustrated steps of an exemplary method, e.g., steps of the method of signaling diagram or 400 of FIG. 4, signaling diagram 500 of FIG. 5, signaling diagram 600 of FIG. 6, and/or steps of the method of flowchart 700 of FIG. 7.

Assembly of components 1500 includes a component 1502 configured to operate the SMF in the second network to communication at least some authentication and/or authorization information sent by the first communications device as part of the registration request or as part of an authentication exchange, to a security entity, e.g., an AUSF or AAA server, in the first network with access to the first network subscriber information. Component 1502 includes a component 1504 configured to operate the SMF in the second network to communicate registration information from the SMF in the second network to AUSF and/or AAA server of the first network via a SMF of the first network. Assembly of components 1500 further includes a component 1506 configured to operate the SMF of the second network to receive an authentication response from the security entity of the first network, and a component 1508 configured to make a decision in the SMF of the second network to: i) provide service to the first communications device via the second network or ii) deny service to the first communications device, said decision being based on the received authentication information. Component 1508 includes a component 1510 configured to decided to provide service to the first communications device via the second network in response to the authentication response from the first communications network indicating that the first communications device is an authenticated user entitled to receive service from the second network.

Assembly of components 1500 further includes a component 1512 configured to operate the SMF in the second network to receive traffic policy information, to be applied to data traffic corresponding to the first communications device when obtaining data traffic services from the second communications network, from a policy control function (PCF) in the first communications network, a component 1514 configured to operate the SMF in the second network to send traffic policy rules to be applied to data traffic corresponding to the first communications device to a UPF in the second communications network, a component 1516 configured to operate the SMF in the second network to apply user traffic policy rules to data traffic communicated through the second communication network by the first communications device using the second IP address which was assigned to the first communications device for use in communicating data traffic through the second communications network and a component 1518 configured to operate the SMF in the second network to communicate data usage information corresponding to the first communications device to an SMF in the first communications network.

Figure 16:
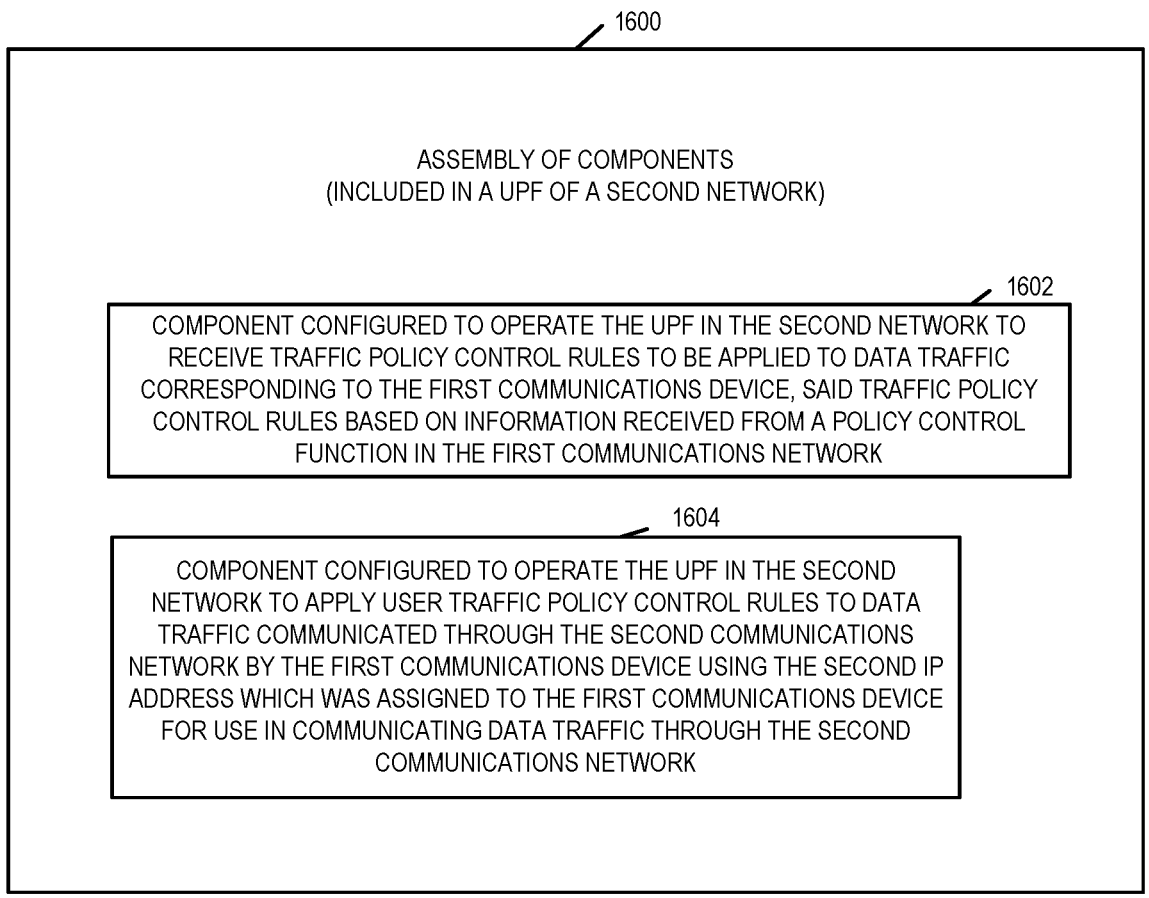
FIG. 16 is a drawing of an assembly of components 1600 which may be included in a user plane function (UPF) entity of a second network in accordance with an exemplary embodiment.

FIG. 16 is drawing of an assembly of components 1600, which may be included in a user plane function (UPF) entity of a second network in accordance with an exemplary embodiment. Assembly of components 1600 is, e.g., included in UFF 110 of second network 150 and/or a UPF entity 1000 of FIG. 10.

The components in the assembly of components 1600 can be, and in some embodiments are, implemented fully in hardware within a processor, e.g., processor 1002, e.g., as individual circuits. The components in the assembly of components 1000 can be, and in some embodiments are, implemented fully in hardware within the assembly of hardware components 1006, e.g., as individual circuits corresponding to the different components. In other embodiments some of the components are implemented, e.g., as circuits, within processor 1002 with other components being implemented, e.g., as circuits within assembly of components 1006, external to and coupled to the processor 1002. As should be appreciated the level of integration of components on the processor and/or with some components being external to the processor may be one of design choice. Alternatively, rather than being implemented as circuits, all or some of the components may be implemented in software and stored in the memory 1008 of the UPF entity 1000, with the components controlling operation of UPF entity 1000 to implement the functions corresponding to the components when the components are executed by a processor e.g., processor 1002. In some such embodiments, the assembly of components 1600 is included in the memory 1008 as part of an assembly of software components 1020. In still other embodiments, various components in assembly of components 1600 are implemented as a combination of hardware and software, e.g., with another circuit external to the processor providing input to the processor which then under software control operates to perform a portion of a component's function.

When implemented in software the components include code, which when executed by a processor, e.g., processor 1002, configure the processor to implement the function corresponding to the component. In embodiments where the assembly of components 1600 is stored in the memory 1008, the memory 1008 is a computer program product comprising a computer readable medium comprising code, e.g., individual code for each component, for causing at least one computer, e.g., processor 1002, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 16 control and/or configure the UPF entity 1000 or elements therein such as the processor 1002, to perform the functions of corresponding steps illustrated in the signaling diagrams and/or described with respect to any of the Figures. Thus, the assembly of components 1600 includes various components that perform functions of corresponding one or more described and/or illustrated steps of an exemplary method, e.g., steps of the method of signaling diagram or 400 of FIG. 4, signaling diagram 600 of FIG. 6, and/or steps of the method of flowchart 700 of FIG. 7.

Assembly of components 1600 includes a component 1602 configured to operate the UPF in the second network to receiver traffic policy control rules to be applied to data traffic corresponding to the first communications device, said traffic policy control rules based on information received from a policy control function (PCF) in the first communications network, and a component 1604 configured to operate the UPF in the second network to apply user traffic policy control rules to data traffic communicated through the second communications network by the first communications device using the second IP address which was assigned to the first communications device for use in communicating data traffic through the second communications network.

Numbered List of Exemplary Method Embodiments:

Method Embodiment 1. A communications method, comprising: operating a network access point (104) in a second network (e.g., cellular base station or other base station in a visited network such as an MNO (mobile network operator network)) to transmit (704) (308) a network identifier, e.g. a Public Land Mobile Network identifier (PLMN ID), associated with a first network operator (e.g., an MVNO with a relationship with an operator of the second network), subscribers to said first network operator being able to receive service via said network access point in the second network; receiving (716) (325 or 334), from a first communications device (e.g., cell phone 102 which may and in some embodiments does include a single SIM corresponding to the first network operator) at the network access point (104) in the second network a registration request signal; operating a session management function (SMF) (108) in the second network, coupled to the network access point (104), to communicate (724) (506 see FIG. 5A) at least some authentication or authorization information (e.g., first communications device credentials that may be and sometimes are in encrypted form) sent by the first communications device to a security entity (122 or 134) in the first network, e.g., entity such as an AAA server which performs authentication and/or authorization services); receiving (728 or 526 or 540) at the SMF (108) of the second network an authentication response from the security entity (122 or 134) in the first network; and making (730) a decision in the SMF (108) to i) provide service to the first communications device (102) via the second (e.g., visited) network or ii) deny service to the first communications device via the second network based on the received authentication response.

Method Embodiment 1AA. The method of Method Embodiment 1, wherein said network identifier is a shared network identifier.

Method Embodiment 1A. The method of Method Embodiment 1, wherein said received registration request signal received by the AP of the second network includes said network identifier (e.g., MNC="009" of a received PLMN ID) associated with the first network operator.

Method Embodiment 1B. The method of Method Embodiment 1, wherein said network identifier (e.g., mobile network code (MNC) value of a PLMN) associated with the first network operator is a value (e.g., "009") indicating the AP (104) of the second network is acting as a sharing node with regard to the first network.

Method Embodiment 1C. The method of Method Embodiment 1, wherein said network identifier value (e.g., 009) associated with the first network operator is a different value from an MNC value associated with the first network operator which is broadcast by an AP of the first network.

Method Embodiment 1D. The method of Method Embodiment 1, wherein said network identifier value (e.g., 009) associated with the first network operator is a different value from an MNC value associated only with the second network which is also being transmitted (broadcast) by the AP of the second network.

Method Embodiment 1E. The method of Method Embodiment 1, wherein said network identifier (e.g. 009) associated with the first network operator which is transmitted by the AP of the second network is in addition to a network identifier (e.g. 010) associated with the second network operator (e.g., MNO=Verizon) which is transmitted by the AP of the second network.

Method Embodiment 1F. The method of Method Embodiment 1, further comprising: operating the first communications device (102) to receive (312 or 705) said network identifier (e.g., MNC="009" of a received PLMN) associated with the first network operator from the access point (104) of the second network; operating the first communications device (102) to convert (313 or 7051) (e.g., map or associate) the received network identifier ("009") to the network identifier being used as the home network identifier of the first network (e.g., MNC of the home PLMN for the first communications device (e.g., H-MVNO MNC)); and operating the first communications device (102) to display (314 or 7052) an indication to the user of the first communications device (102) that home network access (e.g., free WiFi coverage—in accordance with the sharing agreement) is available via the access point in the second network.

Method Embodiment 2. The method of Method Embodiment 1, wherein making a decision (730) in the SMF (108) to: i) provide service to the first communications device (102) in the second network or ii) deny service via the second network to the first communications device includes: deciding (732) to provide service to the first communications device (102) via the second network in response to the authentication response indicating that the first communications device is an authenticated user entitled receive service from the second network (e.g., by virtue of the first communications device corresponding to a subscription to a service provided by the first network operator which entitles the first communications device to receive service from the second communications network when visiting the second communications network).

Method Embodiment 3. The method of Method Embodiment 1, further comprising: operating a first DHCP server (e.g., a DHCP server (401) in the SMF (108) or UPF (110) or AMF (106) of the second (e.g., visited) network) in the second network to receive (708 or 408) a first IP address allocation request from the first communications device (102); and operating the first DHCP server (401) (FIG. 4A) in the second network (e.g., a DHCP server (401) in the SMF (108) or UPF (110) or AMF (106) of the second (e.g., visited) network) to assign (710 or 412) a first IP address to the first communications device (e.g., an IP address which is limited in the second network, e.g., for communication to/from a security device in the first communications network for authentication, authorization purposes).

Method Embodiment 3A. The method of Method Embodiment 3, wherein said assignment (710 or 412) of the first IP address to the first communications device (102) precedes said decision (730) by the SMF (108) to i) provide service to the first communications device (101) via the second (e.g., visited) network or ii) deny service to the first communications device via the second network based on the received authentication response.

Method Embodiment 4. The method of Method Embodiment 3, further comprising: operating the access point in the second network (104) to receive (722) from the first communications device said at least some authentication or authorization information (e.g., first communications device credentials that may be, and sometimes, are in encrypted form) sent by the first communications device (102), said at least some information having been sent using the first IP address (e.g., the IP address assigned to the first communications device for authentication and authorization purposes).

Method Embodiment 4A. The method of Method Embodiment 3, wherein the second communications network (e.g., SMF 108) precludes the first IP address from being used for data services provided by the second communications network.

Method Embodiment 4AA. The method of Method Embodiment 4, wherein the first communications device (102) uses said first IP address to communicate with the security entity (122 or 134) in the first communications network as part of an authentication and authorization process; and wherein the second communications network (e.g., SMF 108) limits the communication associated with the first IP address to communication to one or more devices in the first network associated with authentication, authorization or accounting functions relating to subscribers to services provided by the first network operator.

Method Embodiment 4AAA. The method of Method Embodiment 4AA, wherein authentication and authorization information (e.g., SUPI 140) for the first communications device (102) is stored in the first network (e.g., in UDM 124) and relates to a service subscription (e.g. subscription data 142) which entitles the first communications device (102) to receive services provided by the first network operator (e.g., directly via the network operated by the first network operator or via contractual agreement for services between the first network operator and a second network operator which operates the second network).

Method Embodiment 4AB. The method of Method Embodiment 4, wherein the second network (e.g., visited network) does not store service subscription information, authentication, and/or authorization information corresponding to the first communications device (102) prior to authentication by the security device (122 or 134) of the first communications network.

Method Embodiment 5. The method of Method Embodiment 3, further comprising: operating a second DHCP server (e.g., a DHCP server (401 or 403) in the SMF (108) or UPF (110) or AMF (106) of the second (e.g., visited) network) in the second network to receive (736 or (408 of 552)) a second IP address allocation request from the first communications device (102) following successful authentication of the first communications device by the security device in the first communications network, said second DHCP server being the same DHCP server (401) as said first DHCP server (401) or another DHCP server (403) in the second network (the second network may use the same or a different DHCP server for assignment of second addresses used for data communications than is used for first DHCP addresses used for authentication and/or authorization via the security device in the first communications network); and operating the second DHCP server (401 or 403) in the second network (e.g., a DHCP server in the SMF (108) or UPF (110) or AMF (106) of the second (e.g., visited) network) to assign (738 or (412 of 552)) a second IP address to the first communications device (e.g., an IP address which is to be used by the first communications device (102) for data communication services provided via the second (visited) communications network).

Method Embodiment 6. The method of Method Embodiment 5, wherein the first IP address is leased to the first communications device (102) for a first time period (e.g., a first time period used for authentication/authorization via communications with the security entity (132 or 134) in the first communications network) which is shorter than a second time period for which the second IP address is leased to the first communications device (102) (e.g., wherein the second time period is a time period in which the first communications device (102) is to use the second IP address for data communications services, e.g., to send and receive data to/from other communications devices (e.g., UEs) via the second communications network).

Method Embodiment 7. The method of Method Embodiment 2, further comprising: operating the SMF (108) (VSMF) in the second network to receive (740 or 654) traffic policy information, to be applied to data traffic corresponding to the first communications device (102) when obtaining data traffic services from the second communications network, from a policy control function (128) in the first communications network; and operating the SMF (108) in the second network to apply (744 or 668) the user traffic policy control rules (e.g., max data rate restrictions) to data traffic communicated through the second communications network by the first communications device (102) using the second IP address which was assigned to the first communications device for use in communicating data traffic through the second communications network.

Method Embodiment 7A. The method of Method Embodiment 7, further comprising: operating the SMF (108) in the second network to send (742 or 656) a UPF (110) (VUPF) of the second network user traffic policy control rules to be applied with regard to first communications device user traffic; and operating the UPF (110) in the second network to apply (746 or 661) the user traffic policy control rules (e.g., max data rate restrictions) to data traffic communicated through the second communications network by the first communications device (102) using the second IP address which was assigned to the first communications device for use in communicating data traffic through the second communications network.

Method Embodiment 8. The method of Method Embodiment 7, further comprising: operating (748 or 672) the SMF (108) in the second network to communicate data usage information corresponding to the first communications device to a SMF (118) in the first communications network.

Method Embodiment 9. The method of Method Embodiment 8, wherein the data usage information includes CDR (customer data records) corresponding to the first communications device (102) relating to data traffic communicated to or from the first communications device through the access point (104) in the second communications network (e.g., data traffic corresponding to the first communications device (102) which traverses the second communications network (but which may or may not traverse the first communications network)).

Numbered List of Exemplary System Embodiments:

System Embodiment 1. A communications system (100) comprising: a network access point (104) in a second network (150) (e.g., cellular base station or other base station in a visited network such as an MNO (mobile network operator network)), said network access point (104) including: a first transmitter (914); a first receiver (912); and a first processor (902) configured to: operate the first transmitter (914) to transmit (704) (308) (e.g., broadcast) a network identifier, e.g. a Public Land Mobile Network identifier (PLMN ID), associated with a first network operator (e.g., an MVNO with a relationship with an operator of the second network), subscribers to said first network operator being able to receive service via said network access point (104) in the second network; and operate the first receiver (912) to receive (716) (325 or 334), from a first communications device (e.g., cell phone 102 which may and in some embodiments does include a single SIM corresponding to the first network operator) at the network access point (104) in the second network a registration request signal; a session management function (SMF) entity (108) in the second network, coupled to the network access point (104), said SMF entity (108) including: a second transmitter (1014 of 108); a second receiver (1012 of 108); and a second processor (1002 of 108) configured to: operate the session management function (SMF) entity (108) in the second network, to communicate (724) (506 see FIG. 5A) (e.g. via the second transmitter) at least some authentication or authorization information (e.g., first communications device credentials that may be and sometimes are in encrypted form) sent by the first communications device to a security entity (122 or 134) in the first network, e.g., entity such as an AAA server which performs authentication and/or authorization services); operate the SMF entity (108) in the second network to receive (728 or 526 or 540) at the SMF (108) of the second network (e.g. via second receiver) an authentication response from the security entity (122 or 134) in the first network; and make (730) a decision in the SMF entity (108) to i) provide service to the first communications device (102) via the second (e.g., visited) network or ii) deny service to the first communications device (102) via the second network based on the received authentication response.

System Embodiment 1AA. The communications system (100) of System Embodiment 1, wherein said network identifier is a shared network identifier.

System Embodiment 1A. The communications system (100) of System Embodiment 1, wherein said received registration request signal received by the AP (104) of the second network includes said network identifier (e.g., MNC="009" of a received PLMN ID) associated with the first network operator.

System Embodiment 1B. The communications system (100) of System Embodiment 1, wherein said network identifier (e.g., mobile network code (MNC) value of a PLMN) associated with the first network operator is a value (e.g., "009") indicating the AP (104) of the second network is acting as a sharing node with regard to the first network.

System Embodiment 1C. The communications system (100) of System Embodiment 1, wherein said network identifier value (e.g., 009) associated with the first network operator is a different value from an MNC value associated with the first network operator which is broadcast by an AP (114) of the first network.

System Embodiment 1D. The communications system (100) of System Embodiment 1, wherein said network identifier value (e.g., 009) associated with the first network operator is a different value from an MNC value associated only with the second network which is also being transmitted (broadcast) by the AP (104) of the second network.

System Embodiment 1E. The communications system (100) of System Embodiment 1, wherein said network identifier (e.g., 009) associated with the first network operator which is transmitted by the AP (104) of the second network is in addition to a network identifier (e.g., 010) associated with the second network operator (e.g., MNO=Verizon) which is transmitted by the AP (104) of the second network.

System Embodiment 1F. The communications system (100) of System Embodiment 1, further comprising: said first communications device (102) including: a third receiver (824 or 838); a third transmitter (826 or 840); and a third processor (802) configured to: operate the first communications device (102) to receive (312 or 705) (e.g. via said third receiver) said network identifier (e.g., MNC="009" of a received PLMN) associated with the first network operator from the access point (104) of the second network; operate the first communications device (102) to convert (313 or 7051) (e.g., map or associate) the received network identifier ("009") to the network identifier being used as the home network identifier of the first network (e.g., MNC of the home PLMN for the first communications device (e.g., H-MVNO MNC)); and operating the first communications device (102) to display (314 or 7052) an indication to the user of the first communications device (102) that home network access (e.g., free WiFi coverage—in accordance with the sharing agreement) is available via the access point in the second network.

System Embodiment 2. The communications system (100) of System Embodiment 1, wherein said second processor (1002 of 108) is configured to: operate the SMF entity (108) in the second network to decide (732) to provide service to the first communications device (102) via the second network in response to the authentication response indicating that the first communications device is an authenticated user entitled receive service from the second network (e.g., by virtue of the first communications device corresponding to a subscription to a service provided by the first network operator which entitles the first communications device to receive service from the second communications network when visiting the second communications network), as part of being configured to operate the SMF entity (108) to make a decision (730) in the SMF entity (108) in the second network to: i) provide service to the first communications device (102) in the second network or ii) deny service via the second network to the first communications device (102).

System Embodiment 3. The communications system (100) of System Embodiment 1, further comprising: a first DHCP server (e.g., a DHCP server (401) in the SMF (108) or UPF (110) or AMF (106) of the second (e.g., visited) network) in the second network including: a third receiver (1012 of 401); a third transmitter (1014 of 401); and a third processor (1002 of 401) configured to: operate the first DHCP server (e.g., a DHCP server (401) in the SMF (108) or UPF (110) or AMF (106) of the second (e.g., visited) network) in the second network to receive (708 or 408) (e.g., via the second receiver) a first IP address allocation request from the first communications device (102); and operate the first DHCP server (401) (FIG. 4A) in the second network (e.g., a DHCP server (401) in the SMF (108) or UPF (110) of the second (e.g., visited) network) to assign (710 or 412) a first IP address to the first communications device (e.g., an IP address which is limited in the second network, e.g., for communication to/from a security device (e.g. AUSF 122, UDM 124 and/or AAA 134) in the first communications network for authentication, authorization purposes).

System Embodiment 3A. The communications system (100) of System Embodiment 3, wherein said assignment (710 or 412) of the first IP address to the first communications device (102) precedes said decision (730) by the SMF (108) to i) provide service to the first communications device (102) via the second (e.g., visited) network or ii) deny service to the first communications device (102) via the second network based on the received authentication response.

System Embodiment 4. The communications system (100) of System Embodiment 3, wherein said first processor (902) is further configured to: operate the access point (104) in the second network to receive (722) (e.g., via the first receiver) from the first communications device said at least some authentication or authorization information (e.g., first communications device credentials that may be, and sometimes, are in encrypted form) sent by the first communications device (102), said at least some information having been sent using the first IP address (e.g., the IP address assigned to the first communications device (102) for authentication and authorization purposes).

System Embodiment 4A. The communications system (100) of System Embodiment 3, wherein the second communications network (e.g., SMF 108 in the second communications network) precludes the first IP address from being used for data services provided by the second communications network.

System Embodiment 4AA. The communications system (100) of System Embodiment 4, wherein the first communications device (102) uses said first IP address to communicate with the security entity (AUSF 122 or AAA 134) in the first communications network as part of an authentication and authorization process; and wherein the second communications network (e.g., SMF 108 in the second communications network) limits the communication associated with the first IP address to communication to one or more devices (e.g. AUSF 122, UDM 124, AAA-selector 132, and/or AAA server 134) in the first network associated with authentication, authorization or accounting functions relating to subscribers to services provided by the first network operator.

System Embodiment 4AAA. The communications system (100) of System Embodiment 4AA, wherein authentication and authorization information (e.g., SUPI 140) for the first communications device (102) is stored in the first network (e.g., in UDM 124) and relates to a service subscription (e.g. subscription data 142) which entitles the first communications device (102) to receive services provided by the first network operator (e.g., directly via the network operated by the first network operator or via contractual agreement for services between the first network operator and a second network operator which operates the second network).

System Embodiment 4AB. The communications system (100) of System Embodiment 4, wherein the second network (e.g., visited network, e.g., MNO network 150) does not store service subscription information, authentication, and/or authorization information corresponding to the first communications device (102) prior to authentication by the security device (122 or 134) of the first communications network.

System Embodiment 5. The communications system (100) of System Embodiment 3, further comprising: a second DHCP server (401 or 403) in the second network (e.g., a DHCP server (401 or 403) in the SMF (108) or UPF (110) or AMF (106) of the second (e.g., visited) network) in the second network including: a fourth receiver (1012 of 403); a fourth transmitter (1014 of 403); and a fourth processor (1002 of 403) configured to: operate the second DHCP server (e.g., a DHCP server (401 or 403) in the SMF (108) or UPF (110) of the second (e.g., visited) network) in the second network to receive (736 or (408 of 552)) a second IP address allocation request from the first communications device (102) following successful authentication of the first communications device by the security device in the first communications network, said second DHCP server being the same DHCP server (401) as said first DHCP server (401) or another DHCP server (403) in the second network (the second network may use the same or a different DHCP server for assignment of second addresses used for data communications than is used for first DHCP addresses used for authentication and/or authorization via the security device in the first communications network); and operate the second DHCP server (401 or 403) in the second network (e.g., a DHCP server in the SMF (108) or UPF (110) or AMF (106) of the second (e.g., visited) network) to assign (738 or (412 of 552)) a second IP address to the first communications device (e.g., an IP address which is to be used by the first communications device (102) for data communication services provided via the second (visited) communications network).

System Embodiment 6. The communications system (100) of System Embodiment 5, wherein the first IP address is leased to the first communications device (102) for a first time period (e.g., a first time period used for authentication/authorization via communications with the security entity (132 or 134) in the first communications network) which is shorter than a second time period for which the second IP address is leased to the first communications device (102) (e.g., wherein the second time period is a time period in which the first communications device (102) is to use the second IP address for data communications services, e.g., to send and receive data to/from other communications devices (e.g., UEs) via the second communications network).

System Embodiment 7. The communications system (100) of System Embodiment 2, wherein said second processor (902) is further configured to: operate the SMF (108) entity (VSMF entity) in the second network to receive (740 or 654) (via the second receiver) traffic policy information, to be applied to data traffic corresponding to the first communications device (102) when obtaining data traffic services from the second communications network, from a policy control function (128) in the first communications network; and operate the SMF entity (108) in the second network to apply (744 or 668) the user traffic policy control rules (e.g., max data rate restrictions) to data traffic communicated through the second communications network by the first communications device (102) using the second IP address which was assigned to the first communications device for use in communicating data traffic through the second communications network.

System Embodiment 7A. The communications system (100) of System Embodiment 7, further comprising: a user plane function (UPF) entity (110) of the second network including a third receiver (1012 of 110); and a third processor (1002 of 110); and wherein said second processor (1002 of 108) is further configured to: operate the SMF entity (108) in the second network to send (742 or 656) a UPF (110) (VUPF) of the second network user traffic policy control rules to be applied with regard to first communications device user traffic; and wherein said third processor (1002 of 110) is configured to: operate the UPF (110) in the second network to apply (746 or 661) the user traffic policy control rules (e.g., max data rate restrictions) to data traffic communicated through the second communications network by the first communications device (102) using the second IP address which was assigned to the first communications device for use in communicating data traffic through the second communications network.

System Embodiment 8. The communications system (100) of System Embodiment 7, wherein said second processor (1002 of 108) is further configured to: operate (748 or 672) the SMF (108) in the second network to communicate data usage information corresponding to the first communications device (102) to a SMF (118) in the first communications network.

System Embodiment 9. The communications system (100) of System Embodiment 8, wherein the data usage information includes CDR (customer data record) corresponding to the first communications device (102) relating to data traffic communicated to or from the first communications device through the access point (104) in the second communications network (e.g., data traffic corresponding to the first communications device (102) which traverses the second communications network (but which may or may not traverse the first communications network)).

Various aspects and/or features of some embodiments of the present invention are discussed below. Devices, e.g., devices of customers subscribing to a H-MVNO, are granted connectivity, e.g., free of charge connectivity, to the H-MVNO app server with the help of a AAA server. When a visiting network, e.g., a MNO network, validates a H-MVNO (e.g., Spectrum) SIM, the mutual authentication is deferred to the H-MVNO and the visiting network HSS (or in 5G AUSF/UDM) acts as a proxy agent.

The additional authentication procedure is extended from the visiting network HSS or (or in 5G AUSF/UDM) to the H-MVNO HSS (in 5G this is AUSF, UDM and/or the AA server). The device is authenticated by its home network when there is an agreement between the visiting network (e.g., Verizon) and the home network (e.g., Spectrum).

Further the device can use the device home user profile and service capabilities after the home network authenticates the device. The home network (H-MVNO network) sets up the session QoS from home PCF and SMF towards the visiting network SMF. The visiting network SMF executes the traffic QoS class via visiting UPF.

The transport usage records are collected by the visiting network UPF and SMF. Optionally, the visiting network stores the collected transport usage records in the UDR of the visiting network. The records are reported to the H-MVNO SMF and then stored in UDR of the H-MVNO.

In accordance with a feature of some embodiments of the present invention, the H-MVNO (e.g., Spectrum) is used to authenticate the device (moving to the MNO network), and there is control plane interaction between the MNO and the H-MVNO (e.g., between Verizon and Spectrum) for the subscriber authentication/authorization when a H-MVNO (e.g., Spectrum) customer is moving to a MNO (e.g., Verizon) network. In contrast, the prior art does not use the H-MNVO to authenticate the devices (moving to the MNO network), and there is no control plane interaction between the MNO and the H-MVNO for the subscriber authentication/authorization when a H-MVNO customer is moving to a MNO network.

In accordance with a feature of some embodiments of the present invention, a H-MVNO's customer's subscriber data is used by the MNO when the customer device is visiting the MNO. In contrast, the prior art connectivity service provider of the MNO, which is being visited, does not support subscriber service capabilities of a visiting customer device of a H-MVNO.

In accordance with another feature of some embodiments of the present invention, the visiting network (MNO network) is used for data transport with regard to the visiting H-MVNO customer device, and the H-MVNO customer device usage of the MNO network is reported from the visiting network (MNO) to the home network (H-MVNO). In contrast, in prior art, user data transport for a visiting H-MVNO customer device is via the H-MVNO network.

Various features and/or aspects of some novel procedures, in accordance with some embodiments of the present invention are discussed below. Refer to FIGS. 1 and 2.

The AMF (access and mobility management function), e.g., AMF 106, discovers the AUSF (authentication server function), e.g., AUSF 122, based on the home network identifier (i.e., realm part) and the routing indicator in the SUCI (subscription concealed identifier) provided by the user equipment (UE), e.g., cell phone 102. The home network identifier (e.g., spectrum.net or in the mobile network the PLMN the MCC/MNC) and the routing indicator (e.g., 1234 representing the corresponding the core node, e.g., in Spectrum Mobile networks, in which the UDM 124 contains the device subscription data) are used to select the AUSF 122 (e.g., in Spectrum Mobile).

When the AUSF 122 in an H-MVNO authenticates/authorizes the device using the credentials from an AAA Server 134 in a H-MVNO node, the SUPI (subscription permanent identifier) is used to identify the device towards the AAA server.

The device subscription data is retrieved from the UDM 124 using the SUPI.

When the UDM 124 decides that the primary authentication is performed by the AAA Server in the H-MVNO cloud 154 based on the UE subscription data 142 and UE's SUPI 140, the UDM 124 instructs the AUSF 122 to discover and select the Selector (AAA selector function 132), and then forward extensible authentication protocol (EAP) messages to the AAA-selector 132.

The AAA selector 132 selects the AAA Server, e.g., AAA server 134, based on the domain name corresponding to the realm part of the SUPI.

The provisioning of 3rd party credentials can be implemented within AAA-selector 132 in addition to the H-MVNO AAA cloud server 154. This secondary authentication method allows an external 3rd party AAA server, e.g., AAA server 138, to be selected instead of one of the AAA servers (134, 136) from H-MVNO AAA cloud 154.

In various embodiments, in accordance with features of the present invention, a customer communications device, e.g., a UE, is required to have a subscription with the H-MVNO, but is not required to have subscriptions to one or more additional network operators. Thus, the customer communications device may be a UE with a single SIM card corresponding to the H-MVNO. In accordance with the present invention, the customer communications device may, and sometimes does, connect with a MNO, e.g., Verizon, relying on a service agreement (similar to a roaming agreement, and there is need to utilize the roaming architecture/procedure). The MNO grants the visiting UE with the H-MVNO subscription, network access based on the H-MVNO authentication procedure where the MNO plays a proxy/relay role. Various features of the current invention are directed to defining the routing solution in the MNO based on the SIM card stored home network identifier and the routing indicator.

Various advantages to the approach of the current invention of a single subscription approach for implementation will be described. 3GPP does not have a standardized solution for dual-SIM dual standby in some features (e.g., Access Traffic Steering Switching & Splitting (ATSSS). Single subscription is currently in service provider, e.g., Spectrum, Mobile MVNO solution, and upgrading for all devices with the dual-subscription SIM has significant additional costs. Single subscription is currently the widely deployed scenario in wireline and wireless networks.

The approach, in accordance with the current invention, of only requiring a single H-MVNO subscription is in contrast to a prior art approach of inter-mvno which utilizes a dual-SIM dual standby set up, that means the SIM card stores both MNO and H-MVNO subscription information, and when the device is in the H-MVNO coverage area, the subscription profile of the H-MVNO is used; when the device moves out of the H-MVNO coverage, the device changes to use the MNO subscription information.

Various additional features and/or aspects of some embodiments of the present invention are described below.

Various embodiments, in accordance with the present invention, are event-based and initiated by the customer communications device, not the system.

In some embodiments, in accordance with the present invention, there are two networks as MNO (mobile network operator) and H-MVNO (home mobile virtual network operator) and the H-MVNO device can be, and sometimes is, attached to the MNO and authenticated by the H-MVNO. Device authentication, via the H-MVNO network, is supported for the user device with the H-MVNO subscription in a coverage area of the MNO where no connectivity is possible in a H-MVNO network coverage area via an H-MVNO access point.

Various benefits from using an approach in accordance with the present invention will be described. Connectivity at a location outside the subscription wifi coverage area (home network) can be set up automatically without performing a manual procedure at a visiting area (e.g., where Spectrum has a deployed wifi network). A user of the communications device does not need to look for the visiting network's information. A user of the communications device does not need to search for the access network. A user of the communications device does not need to type in the key of the access network. A user of the communications device can use the user's home network service profile without utilizing visiting network service. Mobility is supported for a H-MVNO's (e.g., Spectrum) customer device anywhere the H-MVNO has a service agreement with the partner MNO (e.g., Verizon) for extending network coverage for the H-MVNO's customers to access the wireless network.

Various embodiments are directed to apparatus, e.g., customer communications devices, access points (APs), cable modems (CMs), cable modem termination systems (CMTSs), wireline-access gateway functions (W-AGFs), access and mobility management functions (AMFs), session management functions (SMFs), user plane functions (UPFs), authentication server functions (AUSFs), unified data managements (UDMs), policy control functions (PCFs), application functions (AFs), AAA-selectors, AAA servers, mobility management entities (MMEs), home subscriber servers (HSSs), user equipments (UEs), e.g. UEs including a single SIM which do not support dual connectivity, UEs supporting dual connectivity, base stations, e.g. sector base stations, such as gNB, ng-eNBs, eNBs, etc. supporting beamforming, UEs, base stations supporting massive MIMO such as CBSDs supporting massive MIMO, network management nodes, access points (APs), e.g., WiFi APs, base stations such as NRU gNB base stations, etc., user devices such as stations (STAs), e.g., WiFi STAs, user equipment (UE) devices, LTE LAA devices, various types of RLAN devices, etc., other network communications devices such as routers, switches, etc., mobile network operator (MNO) base stations (macro cell base stations and small cell base stations) such as a Evolved Node B (eNB), gNB or ng-eNB, mobile virtual network operator (MVNO) base stations such as Citizens Broadband Radio Service Devices (CBSDs), network nodes, MNO and MVNO HSS devices, relay devices, e.g. mobility management entities (MMEs), an AFC system, an Access and Mobility Management Function (AMF) device, servers, customer premises equipment devices, cable systems, network nodes, gateways, cable headend and/or hubsites, network monitoring nodes and/or servers, cluster controllers, cloud nodes, production nodes, cloud services servers and/or network equipment devices. Various embodiments are also directed to methods, e.g., method of controlling and/or operating a customer communications device, an access point (AP), a cable modem (CM), a cable modem termination system (CMTS), a wireline-access gateway functions (W-AGF), an access and mobility management function (AMF), a session management function (SMF), a user plane function (UPF), an authentication server function (AUSF), unified data management (UDM), a policy control functions (PCF), an application function (AF), a AAA-selector, a AAA server, a mobility management entity (MME), a home subscriber server (HSS), a user equipment (UE), e.g. a UE including a single SIM which does not support dual connectivity, a UE supporting dual connectivity, a base station, e.g. a sector base station, such as gNB, ng-eNB, eNB, etc., supporting beamforming, UEs, a base station supporting massive MIMO such as a CBSD supporting massive MIMO, a network management node, access points (APs), e.g., WiFi APs, base stations such as NRU gNB base stations, etc., user devices such as stations (STAs), e.g., WiFi STAs, user equipment (UE) devices, LTE LAA devices, various types of RLAN devices, network communications devices such as routers, switches, etc., user devices, base stations, e.g., eNB and CBSDs, gateways, servers (HSS server), MMEs, an AFC system, cable networks, cloud networks, nodes, servers, cloud service servers, customer premises equipment devices, controllers, network monitoring nodes and/or servers and/or cable or network equipment devices. Various embodiments are directed to communications networks which are partners, e.g., a MVNO network and a MNO network. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements are steps are implemented using hardware circuitry.

In various embodiments nodes and/or elements described herein are implemented using one or more components to perform the steps corresponding to one or more methods, for example, message reception, message generation, signal generation, signal processing, sending, comparing, determining and/or transmission steps. Thus, in some embodiments various features are implemented using components or in some embodiment's logic such as for example logic circuits. Such components may be implemented using software, hardware or a combination of software and hardware.

Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a customer communications device, an access point (AP), a cable modem (CM), a cable modem termination system (CMTS), a wireline-access gateway functions (W-AGF), an access and mobility management function (AMF), a session management function (SMF), a user plane function (UPF), an authentication server function (AUSF), unified data management (UDM), a policy control functions (PCF), an application function (AF), a AAA-selector, a AAA server, a mobility management entity (MME), a home subscriber server (HSS), a user equipment (UE), e.g. a UE including a single SIM which does not support dual connectivity, a UE supporting dual connectivity, a base station, e.g. a sector base station, such as gNB, ng-eNB, eNB, etc., supporting beamforming, a UE, a base station supporting massive MIMO such as a CBSD supporting massive MIMO, a network management device, an access points (AP), e.g., WiFi AP, base stations such as NRU gNB base station, etc., a user device such as a station (STA), e.g., WiFi STA, a user equipment (UE) device, LTE LAA device, etc., an RLAN device, other network communications devices a network communications device such as router, switch, etc., a MVNO base station such as a CBRS base station, e.g., a CBSD, a device such as a cellular base station e.g., an eNB, a MNO HSS server, a MVNO HSS server, a UE device, a relay device, e.g. a MME, a AFC system, etc., said device including a processor configured to implement one, multiple or all of the steps of one or more methods of the invention.

In some embodiments, the processor or processors, e.g., CPUs, of one or more devices, e.g., a customer communications device, an access point (AP), a cable modem (CM), a cable modem termination system (CMTS), a wireline-access gateway functions (W-AGF), an access and mobility management function (AMF), a session management function (SMF), a user plane function (UPF), an authentication server function (AUSF), unified data management (UDM), a policy control functions (PCF), an application function (AF), a AAA-selector, a AAA server, a mobility management entity (MME), a home subscriber server (HSS), a user equipment (UE), e.g. a UE including a single SIM which does not support dual connectivity, a UE supporting dual connectivity, a base station, e.g. a sector base station, such as gNB, ng-eNB, eNB, etc., supporting beamforming, a UE, a base station supporting massive MIMO such as a CBSD supporting massive MIMO, a network management device, communications nodes such as e.g., access points (APs), e.g., WiFi APs, base stations such as NRU gNB base stations, etc., user devices such as stations (STAs), e.g., WiFi STAs, user equipment (UE) devices, LTE LAA devices, etc., various RLAN devices, network communications devices such as routers, switches, etc., a MVNO base station such as a CBRS base station, e.g. a CBSD, an device such as a cellular base station e.g., an eNB, a MNO HSS server, a MVNO HSS device server, a UE device, a relay device, e.g. a MME, a AFC system, are configured to perform the steps of the methods described as being performed by the communications nodes, e.g., controllers. The configuration of the processor may be achieved by using one or more components, e.g., software components, to control processor configuration and/or by including hardware in the processor, e.g., hardware components, to perform the recited steps and/or control processor configuration.

Accordingly, some but not all embodiments are directed to a device, e.g., a customer communications device, an access point (AP), a cable modem (CM), a cable modem termination system (CMTS), a wireline-access gateway functions (W-AGF), an access and mobility management function (AMF), a session management function (SMF), a user plane function (UPF), an authentication server function (AUSF), unified data management (UDM), a policy control functions (PCF), an application function (AF), a AAA-selector, a AAA server, a mobility management entity (MME), a home subscriber server (HSS), a user equipment (UE), e.g. a UE including a single SIM which does not support dual connectivity, UE supporting dual connectivity, base station, e.g. a sector base station, such as gNB, ng-eNB, eNB, etc., supporting beamforming, a UE, a base station supporting massive MIMO such as a CBSD supporting massive MIMO, a network management device, an access points (AP), e.g., WiFi AP, a base station such as NRU gNB base station, etc., a user device such as station (STA), e.g., WiFi STA, a user equipment (UE) device, an LTE LAA device, etc., a RLAN device, a network communications device such as router, switch, etc., administrator device, security device, a MVNO base station such as a CBRS base station, e.g. a CBSD, an device such as a cellular base station e.g., an eNB, a MNO HSS server, a MVNO HSS device server, a UE device, a relay device, e.g. a MME, includes a component corresponding to each of one or more of the steps of the various described methods performed by the device in which the processor is included. In some but not all embodiments a device, e.g., a customer communications device, an access point (AP), a cable modem (CM), a cable modem termination system (CMTS), a wireline-access gateway functions (W-AGF), an access and mobility management function (AMF), a session management function (SMF), a user plane function (UPF), an authentication server function (AUSF), unified data management (UDM), a policy control functions (PCF), an application function (AF), a AAA-selector, a AAA server, a mobility management entity (MME), a home subscriber server (HSS), a user equipment (UE), e.g. a UE including a single SIM which does not support dual connectivity, a user equipment (UE), e.g. a UE supporting dual connectivity, a base station, e.g. a sector base station, such as gNB, ng-eNB, eNB, etc., supporting beamforming, a UE, a base station supporting massive MIMO such as a CBSD supporting massive MIMO, a network management device, an access points (AP), e.g., WiFi AP, a base station such as NRU gNB base station, etc., a user device such as a station (STA), e.g., WiFi STA, a user equipment (UE) device, a LTE LAA device, a RLAN device, a router, switch, etc., administrator device, security device, a AFC system, a MVNO base station such as a CBRS base station, e.g., a CBSD, a device such as a cellular base station e.g., an eNB, an MNO HSS server, a MVNO HSS device server, a UE device, a relay device, e.g. a MME, includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g., one or more steps described above.

Depending on the embodiment, the computer program product can, and sometimes does, include different code for each step to be performed. Thus, the computer program product may, and sometimes does, include code for each individual step of a method, e.g., a method of controlling a controller or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a customer communications device, an access point (AP), a cable modem (CM), a cable modem termination system (CMTS), a wireline-access gateway functions (W-AGF), an access and mobility management function (AMF), a session management function (SMF), a user plane function (UPF), an authentication server function (AUSF), unified data management (UDM), a policy control functions (PCF), an application function (AF), a AAA-selector, a AAA server, a mobility management entity (MME), a home subscriber server (HSS), a user equipment (UE), e.g. a UE including a single SIM which does not support dual connectivity, a user equipment (UE), e.g. a UEs supporting dual connectivity, a base station, e.g., a sector base station, such as gNB, ng-eNB, eNB, etc., supporting beamforming, a UE, a base station supporting massive MIMO such as a CBSD supporting massive MIMO, a network management node or device, a communications device such as a communications nodes such as e.g., an access point (AP), e.g., WiFi AP, a base station such as NRU gNB base station, etc., a user device such as a station (STA), e.g., WiFi STA, a user equipment (UE) device, a LTE LAA device, etc., an RLAN device, a network communications device such as router, switch, etc., administrator device, MNVO base station, e.g., a CBSD, an MNO cellular base station, e.g., an eNB or a gNB, a UE device or other device described in the present application. In some embodiments, components are implemented as hardware devices in such embodiments the components are hardware components. In other embodiments components may be implemented as software, e.g., a set of processor or computer executable instructions. Depending on the embodiment the components may be all hardware components, all software components, a combination of hardware and/or software or in some embodiments some components are hardware components while other components are software components.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A communications method, comprising:
operating a network access point in a second network to transmit a network identifier, associated with a first network operator, subscribers to said first network operator being able to receive service via said network access point in the second network; and
operating a first DHCP server in the second network to receive a first IP address allocation request from a first communications device; and
operating the first DHCP server in the second network to assign a first IP address to the first communications device;
receiving, from the first communications device at the network access point in the second network, a registration request signal;
operating a session management function (SMF) in the second network to communicate at least some authentication or authorization information, sent by the first communications device to the network access point in the second network, to a security entity in a first network;
receiving at the SMF in the second network an authentication response from the security entity in the first network; and
making a decision in the SMF to i) provide service to the first communications device via the second network or ii) deny service to the first communications device via the second network based on the received authentication response.

2. The method of claim 1, wherein said network identifier is a shared network identifier.

3. The method of claim 1, wherein making a decision in the SMF to: i) provide service to the first communications device in the second network or ii) deny service via the second network to the first communications device includes:
deciding to provide service to the first communications device via the second network in response to the authentication response indicating that the first communications device is an authenticated user entitled receive service from the second network.

4. The method of claim 1, further comprising:
operating the access point in the second network to receive from the first communications device said at least some authentication or authorization sent by the first communications device, said at least some information having been sent using the first IP address.

5. The method of claim 1, further comprising:
operating a second DHCP server in the second network to receive a second IP address allocation request from the first communications device following successful authentication of the first communications device by the security entity in the first communications network, said second DHCP server being the same DHCP server as said first DHCP server or another DHCP server in the second network; and
operating the second DHCP server in the second network to assign a second IP address to the first communications device.

6. The method of claim 5, wherein the first IP address is leased to the first communications device for a first time period which is shorter than a second time period for which the second IP address is leased to the first communications device.

7. The method of claim 3, further comprising:
operating the SMF in the second network to receive traffic policy information, to be applied to data traffic corresponding to the first communications device when obtaining data traffic services from the second network, from a policy control function in the first network; and
operating the SMF in the second network to apply the user traffic policy control rules to data traffic communicated through the second network by the first communications device using the second IP address which was assigned to the first communications device for use in communicating data traffic through the second network.

8. The method of claim 7, further comprising:
operating the SMF in the second network to communicate data usage information corresponding to the first communications device to a SMF in the first communications network.

9. The method of claim 8, wherein the data usage information includes CDR (customer data records) corresponding to the first communications device relating to data traffic communicated to or from the first communications device through the network access point in the second network.

10. The method of claim 1, wherein said received registration request signal received by the network access point in the second network includes said network identifier associated with the first network operator.

11. The method of claim 1, wherein said network identifier associated with the first network operator is a value indicating the network access point in the second network is acting as a sharing node with regard to the first network.

12. The method of claim 1, wherein said network identifier value associated with the first network operator is a different value from an MNC value associated with the first network operator which is broadcast by an AP of the first network.

13. The method of claim 1, wherein said network identifier value associated with the first network operator is a different value from an MNC value associated only with the second network which is also being transmitted (broadcast) by the network access point in the second network.

14. A communications system comprising:
a session management function (SMF) entity in a second network, said SMF entity including:
a first transmitter;
a first receiver; and
a first processor configured to:
operate the SME entity in the second network to communicate at least some authentication or authorization information, sent by a first communications device to a network access point in the second network, to a security entity in a first network;
operate the SMF entity in the second network to receive an authentication response from the security entity in the first network; and
make a decision in the SMF entity to i) provide service to the first communications device via the second network or ii) deny service to the first communications device via the second network based on the received authentication response;
said network access point in the second network, said network access point including:
a second transmitter;
a second receiver; and
a second processor configured to:
operate the second transmitter to transmit a network identifier, associated with a first network operator, subscribers to said first network operator being able to receive service via said network access point in the second network; and
operate the second receiver to receive, from said first communications device, a registration request signal; and
a first DHCP server in the second network including:
a third receiver;
a third transmitter; and
a third processor configured to:
operate the first DHCP server in the second network to receive a first IP address allocation request from the first communications device; and
operate the first DHCP server in the second network to assign a first IP address to the first communications device.

15. The communications system of claim 14, wherein said network identifier is a shared network identifier.

16. The communications system of claim 14, wherein said first processor is configured to:
operate the SMF entity in the second network to decide to provide service to the first communications device via the second network in response to the authentication response indicating that the first communications device is an authenticated user entitled receive service from the second network, as part of being configured to operate the SMF entity to make a decision in the SMF entity in the second network to: i) provide service to the first communications device in the second network or ii) deny service via the second network to the first communications device.

17. The communications system of claim 14, wherein said second processor is further configured to:
operate the network access point in the second network to receive from the first communications device said at least some authentication or authorization information sent by the first communications device, said at least some information having been sent using the first IP address.

18. The communications system of claim 14, further comprising:
a second DHCP server in the second network including:
a fourth receiver;
a fourth transmitter; and
a fourth processor configured to:
operate the second DHCP server in the second network to receive a second IP address allocation request from the first communications device following successful authentication of the first communications device by the security entity in the first network, said second DHCP server being the same DHCP server as said first DHCP server or another DHCP server in the second network; and
operate the second DHCP server in the second network to assign a second IP address to the first communications device.

19. The communications system of claim 18, wherein the first IP address is leased to the first communications device for a first time period which is shorter than a second time period for which the second IP address is leased to the first communications device.

20. The communications system of claim 16, wherein said first processor is further configured to:

operate the SMF entity in the second network to receive traffic policy information, to be applied to data traffic corresponding to the first communications device when obtaining data traffic services from the second network, from a policy control function in the first network; and operate the SMF entity in the second network to apply the user traffic policy control rules to data traffic communicated through the second network by the first communications device using the second IP address which was assigned to the first communications device for use in communicating data traffic through the second network.

21. The communications system of claim 20, wherein said first processor is further configured to:

operate the SMF entity in the second network to communicate data usage information corresponding to the first communications device to a SMF in the first network.

22. The communications system of claim 21, wherein the data usage information includes CDR (customer data record) corresponding to the first communications device relating to data traffic communicated to or from the first communications device through the access point in the second network.

\* \* \* \* \*